(12) United States Patent
Prakash

(10) Patent No.: US 9,720,560 B2
(45) Date of Patent: Aug. 1, 2017

(54) HIERARCHICAL LAYERED MENU PANE ACCESS TO APPLICATION FUNCTIONALITY AND CONTENT

(75) Inventor: Priya Prakash, London (GB)

(73) Assignee: British Broadcasting Corporation, London (GB)

( * ) Notice: Subject to any disclaimer, the term of this patent is extended or adjusted under 35 U.S.C. 154(b) by 1451 days.

(21) Appl. No.: 12/293,569

(22) PCT Filed: Mar. 19, 2007

(86) PCT No.: PCT/GB2007/000930
§ 371 (c)(1),
(2), (4) Date: Dec. 9, 2010

(87) PCT Pub. No.: WO2007/107712
PCT Pub. Date: Sep. 27, 2007

(65) Prior Publication Data
US 2011/0145753 A1    Jun. 16, 2011

(30) Foreign Application Priority Data

Mar. 20, 2006    (GB) .................................... 0605587.5

(51) Int. Cl.
*G06F 3/0481*    (2013.01)
*G06F 3/0482*    (2013.01)
(Continued)

(52) U.S. Cl.
CPC ........ *G06F 3/04812* (2013.01); *G06F 3/0481* (2013.01); *G06F 3/0482* (2013.01);
(Continued)

(58) Field of Classification Search
CPC .... G06F 3/0481; G06F 3/0482; G06F 9/4443; G06F 2203/04803; G06F 2203/04805;
(Continued)

(56) References Cited

U.S. PATENT DOCUMENTS 5,689,667 A * 11/1997 Kurtenbach .................. 715/810
5,712,995 A *  1/1998 Cohn ........................... 715/792
(Continued)

FOREIGN PATENT DOCUMENTS

| EP | 0869425 A2 | 3/1998 |
| EP | 0880090 A2 | 4/1998 |

(Continued)

OTHER PUBLICATIONS

Kwang, et al., "The Embedded Zooming Applications For Personal Digital Assistants", IEEE Xplore, 2003, pp. 109-116.

*Primary Examiner* — Eric J Bycer
(74) *Attorney, Agent, or Firm* — Dinsmore & Shohl LLP

(57) ABSTRACT

A graphical user interface for a computer program, the interface comprising an array of main panes each providing access to a particular aspect of the program, the panes being in register with one another at a vertex corresponding to the area in which all the panes meet, each of the panes being adapted to expand as a pointing device highlights a pane, the expansion of said pane relative to the other panes wherein the panes remain in register with one another at the vertex as a pane expands.

19 Claims, 31 Drawing Sheets

(51) Int. Cl.
*G06F 9/44* (2006.01)
*H04N 5/445* (2011.01)
*H04N 21/462* (2011.01)
*H04N 21/482* (2011.01)

(52) U.S. Cl.
CPC .. *G06F 9/4443* (2013.01); *G06F 2203/04803* (2013.01); *G06F 2203/04805* (2013.01); *G06F 2203/04806* (2013.01); *H04N 5/44543* (2013.01); *H04N 21/4622* (2013.01); *H04N 21/482* (2013.01); *H04N 2005/44573* (2013.01)

(58) Field of Classification Search
CPC ...... G06F 2203/04806; H04N 5/44543; H04N 21/4622; H04N 21/482; H04N 2005/44573
USPC ....... 715/766, 767, 783, 788, 792–794, 799, 715/800, 805, 810, 815, 817, 821, 828, 715/829, 841; 725/37, 39, 45, 52
See application file for complete search history.

(56) References Cited

U.S. PATENT DOCUMENTS

| | | | | |
|---|---|---|---|---|
| 5,721,853 A | * | 2/1998 | Smith | 715/803 |
| 5,771,042 A | * | 6/1998 | Santos-Gomez | 715/800 |
| 5,917,492 A | * | 6/1999 | Bereiter et al. | 715/854 |
| 6,342,908 B1 | * | 1/2002 | Bates et al. | 715/798 |
| 6,353,451 B1 | * | 3/2002 | Teibel et al. | 715/803 |
| 6,414,700 B1 | * | 7/2002 | Kurtenbach et al. | 715/810 |
| 6,781,610 B2 | * | 8/2004 | Os et al. | 715/764 |
| 6,832,355 B1 | * | 12/2004 | Duperrouzel et al. | 715/788 |
| 6,978,472 B1 | * | 12/2005 | Nashida et al. | 725/52 |
| 7,246,329 B1 | * | 7/2007 | Miura et al. | 715/810 |
| 2001/0030667 A1 | * | 10/2001 | Kelts | 345/854 |
| 2002/0000998 A1 | * | 1/2002 | Scott et al. | 345/667 |
| 2002/0049620 A1 | * | 4/2002 | Uchida et al. | 705/5 |
| 2002/0180800 A1 | * | 12/2002 | Taylor et al. | 345/788 |
| 2003/0020671 A1 | * | 1/2003 | Santoro et al. | 345/1.3 |
| 2003/0043206 A1 | * | 3/2003 | Duarte | 345/810 |
| 2004/0125140 A1 | * | 7/2004 | Bell et al. | 345/765 |
| 2004/0128317 A1 | * | 7/2004 | Sull et al. | 707/104.1 |
| 2004/0261037 A1 | * | 12/2004 | Ording et al. | 715/788 |
| 2005/0091599 A1 | * | 4/2005 | Yamakado et al. | 715/732 |
| 2005/0108655 A1 | * | 5/2005 | Andrea et al. | 715/798 |
| 2005/0125742 A1 | * | 6/2005 | Grotjohn et al. | 715/799 |
| 2005/0210399 A1 | * | 9/2005 | Filner et al. | 715/767 |
| 2005/0231520 A1 | * | 10/2005 | Forest | 345/581 |
| 2006/0075359 A1 | * | 4/2006 | Bauchot et al. | 715/790 |
| 2006/0190833 A1 | * | 8/2006 | SanGiovanni et al. | 715/767 |
| 2006/0212827 A1 | * | 9/2006 | Lee | 715/810 |
| 2006/0248471 A1 | * | 11/2006 | Lindsay et al. | 715/800 |
| 2007/0083911 A1 | * | 4/2007 | Madden et al. | 725/135 |
| 2007/0101289 A1 | * | 5/2007 | Awada et al. | 715/784 |
| 2007/0136690 A1 | * | 6/2007 | MacLaurin et al. | 715/822 |

FOREIGN PATENT DOCUMENTS

| | | |
|---|---|---|
| EP | 1363246 A1 | 11/2003 |
| WO | 03021949 A1 | 3/2003 |

\* cited by examiner

HIERARCHICAL LAYERED MENU PANE ACCESS TO APPLICATION FUNCTIONALITY AND CONTENT

The present invention relates in general to, graphical user interfaces, an apparatus, methods of use a graphical user interface, a method of displaying search results to a user, and a system. In particular the invention relates to graphical user interfaces, an apparatus, methods of use a graphical user interface, a method of displaying search results to a user, and a system suitable for providing content to a user.

BACKGROUND OF THE INVENTION

It is common to provide a graphical user interface for user interaction with computer systems. Such an interface provides to the user presentation of information about the computer and its components and associated systems and data, both hardware and software. By use of graphical objects such as windows, icons, toolbars, control boxes and control buttons, the user is shown what software modules are available for selection and execution. One common aspect of computer interfaces is the directory tree structure, which provides a structure for organising information (e.g. software applications or computer files) which have related subject matter or common themes as nodes or limbs of a directory tree. The information is thus organised into a set of directories and sub-directories. This powerful tool provides an intuitive representation of logical groupings and relationships between such logical groupings of multiple pieces of information. Within the directory tree structure, a user can select and manipulate pieces of information (e.g. files, or weblinks) represented by nodes or limbs within the tree using a mouse, keyboard, trackball, pointer, remote control cursor or other user-operated input device. User selection via a mouse can be accomplished by 'pointing and clicking' on a selectable feature on the computer display.

While the directory tree structure is very useful, it is not the best solution for many applications. Interfaces for consumer home use, such as navigation interfaces for interactive media players, should ideally be wholly user friendly and intuitive, as users of such systems may have a very limited knowledge and understanding of computer operation. In addition, such interfaces should be fully visual, constantly providing as much relevant graphical information to the user as possible, without requiring any complex navigation or user selection strategy. In this regard conventional directory tree structures are far from ideal, as they generally require controls which allow a given subdirectory to be expanded into view, or conversely to be hidden or collapsed from view, and this requires careful selective navigation by the user. In addition, the usual approach necessitates careful manipulation by the user to scroll through items of a selected subdirectory. Further, in the conventional directory tree approach, all items within a particular target subdirectory are displayed with equal emphasis, even though the majority may be irrelevant to a current task or content sought.

SUMMARY OF THE INVENTION

The present invention, then, relates in general to a graphical user interface for a computer system, and in particular an interface for interaction by a user for operating a digital content viewer such as an interactive media player, providing navigation and display functionality. The interface is configured to simultaneously display multiple pieces of information to a viewer, the information organised in a hierarchical structure and displayed for intuitive navigation by a user. The hierarchical structure of the information comprises multiple pieces of information at each of a plurality of information levels.

Apparatus Interface:

According to one aspect of the invention, there is provided an apparatus having a display screen and a user controllable pointing device for enabling a user to control the apparatus by the manipulation of the pointing device on the display screen, the apparatus comprising means for displaying on the display screen an array of panes in register with one another at a vertex corresponding to the area (or region) in which all the panes meet, each of the panes providing a user with means for accessing particular functionality of the apparatus, means for detecting the presence of the pointing device over a pane, and means for expanding a pane relative to the other panes in response to the detection of the pointing device over a pane, wherein the panes remain in register with one another at the vertex as a pane expands.

Thus, the apparatus provides for a particularly optimised use of display space whilst maximising the information available to a user at any one time. Furthermore, maintaining the panes in register as one pane expands advantageously means that the expanding pane does not overlap the content of the other panes as the expansion and contractions occur.

Preferably the expanding means is adapted to contract the other panes as one pane expands. This further enhances the optimised use of the display area.

The expanding means is preferably adapted to move a pane towards the centre of the display screen as a pane is expanded. Advantageously this provides content of current interest to a user at more convenient location.

The expanding means is preferably adapted to move the vertex along a diagonal line towards an outer edge of the display screen. The expanding means may be adapted to move the vertex at an angle of 45 degrees.

The movement toward the edge of the screen advantageously relegates panes of less current interest to peripheral areas of vision. The movement along a diagonal (and in particular a 45 degree diagonal) provides a visually smooth transition which allows a user to track content in multiple planes as they move.

Preferably the expanding means is adapted to move the vertex substantially along an "x" centred substantially in the middle of the display screen as the presence of the pointing device is detected over successive panes.

The panes preferably expand and move/centralise around a square positioned approximately in the centre of the display screen, the size of the square preferably being proportional to a factor of between 1.2 and 2 times the size of an unexpanded pane, and preferably being proportional to a factor of 1.6 times the size of an unexpanded pane. Such movement and such factors are particularly beneficial for providing smooth transitions between the various visual states without significantly compromising the user's ability to track the content of different panes as they expand/move/contract.

At least a "square number" of panes are preferably provided. Preferably, for example 4, 6, 8, 9, 12, 16 or 25 panes may be provided. This allows for an advantageous arrangement of such panes in a square grid, which is particularly beneficial for allowing a user to find relevant content quickly.

The display means may be adapted to prevent the panes from overlapping with one another at any time, thereby beneficially ensuring content of the panes remains available.

The expanding means is preferably adapted to continue to expand a pane in response to the continued detection by the detecting means of the pointing device over the pane until the pane reaches a specified maximum size. A smooth gradual expansion in this manner is particularly advantageous over an instantaneous shift from one visual state to another (e.g. contracted to fully expanded), for example, if a user accidentally moves the mouse pointer over a different pane from the one they are currently viewing.

The maximum size may be between 1.2 and 2 times the size of an unexpanded pane, and preferably 1.6 times the size of an unexpanded pane.

Preferably the apparatus further comprises means for enabling a user to select a pane using the pointing device, wherein the detecting means is preferably adapted to detect the selection of a pane by the pointing device. The expanding means may be adapted to expand the pane to a maximum size in response to the selection.

The maximum size may be at least 1.6 times the size of an unexpanded pane, and preferably results in the selected pane occupying substantially all of the available display screen real estate.

The display means is preferably adapted to move the panes over which the pointing device has not been detected towards an outer periphery of the display screen as a pane is expanded.

Preferably the apparatus further comprises means for animating the panes. The animating means may be adapted to reduce animation of those panes over which the pointing device has not been detected.

The display means may be adapted to adjust the opacity of the panes in dependence on whether or not the pointing device has been detected over a pane and may further be adapted to increase the opacity of a pane over which the pointing device is detected.

The display means is preferably adapted to maintain the relative positions of the panes to one another.

The panes are preferably in the form of rectangles or squares.

The display means may be adapted to display a plurality of sub-panes within each (main) pane, wherein the detecting means and the expanding means are preferably adapted to expand and contract the sub-panes in substantially the same manner as the (main) panes in response to the movement of the pointing device over the sub-panes.

A "square number" of sub-panes are preferably provided within each (main) pane. The display means may be adapted to provide visual indicia in addition to the sub-panes within each (main) pane for providing access to further panes or sub-panes.

The display means may be adapted to display the panes on a graphical background. The apparatus may further comprise means for enabling a user to select the graphical background.

Preferably at least one pane provides a user with means for accessing audiovisual content items. At least one pane may provide a user with means for playing audiovisual content items. At least one pane may provide a user with means for controlling and/or organising audiovisual content items.

'Square' Option Array:

According to a further form of the invention, there is provided a method of providing content data for navigation and selection on a display device by a user using a control device, the content data organised into a directory or hierarchical structure, wherein a plurality of content options are displayed to the user as a substantially rectangular tiled array of content indicia each occupying a substantially rectangular screen area.

Preferably, interaction with a particular one of said content indicia by the user by way of said control device causes the screen area occupied by the interacted content indicium to expand on said display device in a way that maintains its position in said array relative to the other content option indicia.

Preferably interaction with a particular one of said content indicia by the user by way of said control device causes the space occupied by a plurality of other content indicia to be replaced in dependence on the interacted content indicium. The plurality of other content indicia may move to occupy an area peripheral to the occupied space or may simply be replaced. Any content indicia located in a region which is not occupied may be replaced by other content indicia, or may simply remain unchanged.

The space may be occupied by a media player, content related to said interacted content indicium, and/or a larger version of the interacted content indicium.

Preferably, said content indicia occupy respectively discrete and non-overlapping screen areas, irrespective of whether or not the user is interacting with any one of them.

In addition, interaction with a particular one of said content indicia by the user by way of said control device may:
  cause said screen area to move to a relatively central area on said display device; and/or
  cause said other ones of the content indicia to contract on said display device.

The rectangular screen areas occupied by the respective content indicia may be square. Further, the rectangular tiled array of content indicia may also be square.

Preferably, the number of content indicia in the tiled array is a square (4, 9, 16, 25, etc).

In accordance with this form of the invention, a simple navigation structure is presented to the user. Interaction with (e.g., by passing a cursor over, or by clicking on) a particular content indicium results in the screen area occupied by that indicium expanding and, preferably, centralising within the display or at least moving nearer to the centre of the display. The remaining indicia are thus displayed with relatively lower emphasis to the user, but the relative and familiar positions of the content indicia is maintained, making it very simple for the user to locate and interact with another content indicium. In the case of a tiled array of four display areas, each presenting an alternative content indicium, the common vertex of the four areas may be maintained, even though this point will travel around the display as the user interacts with different indicia and the respective screen areas occupied by those indicia expand and contract and, optionally, move towards and away from a relatively central area of the display. This point provides a simple and constant reference for the user to use for navigation. Even when the user 'drills down' into content options, e.g. by selecting sub-options available within a particular one of the four display area with which he or she is interacting (and being provided with corresponding further content indicia for further navigation), the other three original options may remain in register with one another and directly accessible on the display.

As used herein, the term "mouse-over" is to be understood to mean any form of hovering over a graphical user interface item with any pointing device such as a mouse.

Similarly, as used herein, the term "mouse-down" is to be understood to mean any form of selection of a graphical user interface item with a pointing device such as a mouse.

Preferably, the common vertex moves along a substantially diagonal line from the centre of the screen (when the interface is in initial state) to a point towards an outer edge of the screen as a particular display area expands.

More preferably, the vertex is constrained to track an "x" as each display area is expanded and/or contracted.

In a case where there are more than 4 display areas, and hence more than one vertex, each vertex will be constrained to track and "x" as each display area is expanded and/or contracted. Thus, if an outer display area is expanded the vertices will move on parallel line towards an outer edge of the screen, and if an inner display area is expanded, the vertices will move in opposite directions towards an outer edge of the screen.

This navigation structure can be repeated within each content option, as sub-options can be similarly presented to the user as a rectangular tiled array of content indicia each occupying a rectangular screen area. If there are more content options to be available to the user than there are screen areas within the tiled array, then one of the screen areas may provide access to further content options.

The rectangular form of the screen areas comprising content indicia is particularly suited to accessing image or video content. For example, in the case of video content, the user may navigate to a content indicium representing a required video, and selection of that video can then initiate playback (e.g. of a preview or sample clip) within that rectangular screen area.

According to a further form of the invention, there is provided an interactive graphical user interface for display of content data for navigation and selection on a display device by a user using a control device, the content data organised into a directory or hierarchical structure with a plurality of successive levels of selection options, each selection option corresponding to a content access indicium and linking to a further plurality of selection options in the next level, wherein, at each selection option, all of the selection options available under that selection option are simultaneously displayed to the user as corresponding content access indicia in respective ones of a plurality of screen areas, such that for any selection option the user is able to simultaneously view all of the selection options available under that selection option.

Fractal Content Display:

According to a further form of the invention, there is provided a method of providing content data for navigation and selection on a display device by a user using a control device, the content data organised into a directory or hierarchical structure with a plurality of successive levels of selection options, each selection option corresponding to a content access indicium and linking to a further plurality of selection options in the next level, wherein, at each selection option, all of the selection options available under that selection option are simultaneously displayed to the user as corresponding content access indicia in respective ones of a plurality of screen areas, such that for any selection option the user is able to simultaneously view all of the selection options available under that selection option.

Preferably, all or at least a plurality of selection options from the previous level and/or the base level are simultaneously displayed to the user.

In this way, through a succession of levels of the directory structure, each level comprising a number of selection options and each selection option linking to a further plurality of selection options in the next level, the user can readily navigate from one level to the next, as none of the linked selection options are hidden from the screen or need to be accessed through further manipulation (such as through scrolling features). This considerably enhances the user experience.

According to a further form of the invention, there is provided an interactive graphical user interface for display of content data for navigation and selection on a display device by a user using a control device, the content data organised into a directory or hierarchical structure with a plurality of successive levels of selection options, each selection option corresponding to a content access indicium and linking to a further plurality of selection options in the next level, wherein, at each selection option, all of the selection options available under that selection option are simultaneously displayed to the user as corresponding content access indicia in respective ones of a plurality of screen areas, such that for any selection option the user is able to simultaneously view all of the selection options available under that selection option.

Fractal Concept:

According to a yet further form of the invention, there is provided a method of providing content data for navigation and selection on a display device by a user using a control device, the content data organised into a directory or hierarchical structure with a number of successive levels of selection options, each selection option corresponding to a content access indicium and linking to a further plurality of selection options in the next level, wherein, at a first level in the directory or hierarchical structure, all the available selection options available are simultaneously displayed to the user as corresponding content access indicia in respective ones of a plurality of screen areas, and wherein, on selection of a particular selection option and thereby proceeding to a second level in the directory structure, said other selection options in the first level remain displayed to the user as corresponding content access indicia in respective ones of a plurality of screen areas.

Preferably, content access indicia representing said further plurality of selection options linked from a particular selection option are simultaneously displayed as discrete and non-overlapping screen sub-areas within the screen area of said particular selection option.

In this way, not only can the different selection options at one level all be displayed to the user, but when a selection option links to further selection options in the next level, these further options can be simultaneously displayed as separate (navigable and selectable) screen areas within the screen area corresponding to the particular selection option. In a preferred embodiment, this functionality is only enabled when the screen area has expanded due to interaction or selection by the user.

This can be regarded as a 'fractal' directory display pattern, as each 'parent' content access indicia of an array of such indicia can in turn comprise an array of 'child' content access indicia, each displayed as a sub-area within the screen area of the 'parent' indicia. This enables the user to simultaneously view multiple options at a plurality of different levels within the directory structure, without having to navigate (i.e. to 'move') from one level to the next (and thus lose the direct accessibility of other options in the level from which the user has had to move. When the user interacts with a sub-area, this can in turn expand—and, optionally, move to a relatively central area—within the 'parent' screen area.

In any of the forms of the invention defined herein, in a preferred option, said plurality of screen areas are displayed to the user as discrete and non-overlapping screen areas.

Preferably, the graphical user interface is in operable communication with a computing device containing a computer programme comprising programme modules executable by the computing device.

The content access indicium can be any appropriate graphical information (or combination of pieces of graphical information) to indicate to the user what content is available in that selection option. It may include, for example, screen icons, screen controls, thumbnails, text, dialogue boxes, search screens, images (or slideshow successions of images), video players, audio players, etc.

In all embodiments the screen areas may be any suitable shape. In one embodiment, the screen areas are rectangular, and preferably square.

Preferably, interaction with a particular one of said screen areas by the user by way of said control device causes said screen area to expand on said display device and, optionally, all other said screen areas to contract on said display device. This important feature may be provided independently. Preferably, the contraction only occurs when a particular screen area is selected rather than just hovered over.

This expansion and optional corresponding contraction is realised such that all of the control access indicia of other available selection options are still available on the display device, preferably as discrete and non-overlapping screen areas.

For example, if the user moves a mouse pointer (which item includes similar devices) over a particular content access indicium, the screen area of that indicium expands to enhance the display of the information contained within that indicium. Just by way of example, the linear dimensions of a screen area may expand to roughly 1.6 times, say 1.5 to 1.75 times, (the so-called 'golden ratio') on interaction by the user.

Preferably, as the mouse pointer continues to hover over a particular content access indicium the screen area of the indicium continues to expand until it reaches a maximum size. More preferably, as the mouse pointer is moved off a content access indicium that content access indicium returns to its initial size.

Preferably, if a user clicks on a particular content access indicium that content access indicium expands to its full size.

In addition, interaction with said screen area may cause said screen area to move to a relatively central area on said display device.

Preferably, selection by the user of said particular one screen area by way of said control device (e.g. by clicking on a mouse button) causes said screen area to expand yet further on said display device to a maximum size.

In addition, selection by the user of said screen area may cause said screen area to move to a relatively more central area on said display device.

According to a further form of the invention, there is provided an interactive graphical user interface for display of content data for navigation and selection on a display device by a user using a control device, the content data organised into a directory or hierarchical structure with a number of successive levels of selection options, each selection option corresponding to a content access indicium and linking to a further plurality of selection options in the next level, wherein, at a first level in the directory or hierarchical structure, all the available selection options available are simultaneously displayed to the user as corresponding content access indicia in respective ones of a plurality of screen areas, and wherein, on selection of a particular selection option and thereby proceeding to a second level in the directory structure, said other selection options in the first level remain displayed to the user as corresponding content access indicia in respective ones of a plurality of screen areas.

Search Results Display:

According to a further form of the invention, there is provided a computer-based method of displaying search results to a user wishing to access available data content, comprising the steps of:

providing to the user a means of inputting search terms;
receiving from the user one or more search terms;
conducting a search in accordance with the received search term(s);
displaying to the user a prescribed search results screen area, containing discrete graphical indicia representing all of the search results returned.

Preferably, said method further includes:
receiving one or more additional search terms from the user;
using said one or more additional search terms to refine the search results;
displaying to the user the refined search results by displaying discrete graphical indicia representing all the refined search results within the prescribed search results screen area.

Preferably the size of said indicia is determined in dependence on the number of search results returned. Said results may be dynamically reduced as said search term is typed. The size of said indicia may increase as the number of search results returned reduce.

Preferably, the indicia representing the search results are substantially equally sized within the prescribed search results screen area, and the graphical indicia substantially completely occupy said prescribed search results screen area.

In this way, throughout a particular search, as further search terms are submitted by the user the prescribed search results screen area may be substantially completely filled with graphical indicia representing all search results returned. As the search results are filtered (refined) through submission of additional terms, the number of results will generally reduce. There is therefore a corresponding increase in the size of the respective representative discrete graphical indicia.

This provides a very simple and intuitive feedback functionality to the user of the progress of a search, as the user receives a direct visual impression of the number of results returned in response to a search term, by way of the number of indicia contained within the search results screen area (and, accordingly, the size of each indicium).

Preferably, interaction by a user-controlled control device with a graphical indicium representing a particular item of data content provides that item of data content to be delivered to or accessible by the user.

By way of example, the user can simply click on a particular indicium (such as a thumbnail image) to directly access the relevant content, e.g. to initiate playback of video content represented by the image.

According to a further form of the invention, there is provided a graphical user interface for displaying search results to a user wishing to access available data content, the interface comprising:

means for inputting search terms;

means for receiving from the user one or more search terms;

means for conducting a search in accordance with the received search term(s);

means for displaying to the user a prescribed search results screen area, containing discrete graphical indicia representing all of the search results returned.

Buddy List Concept:

In accordance with a further aspect of the invention, there is provided a graphical user interface for a computer program which allows a user to access content items, the graphical user interface comprising means for displaying particular content items, means for forwarding particular content items to selected other users, and a list of users to which the content may be forwarded represented in the form of a graphic icons each corresponding to another user and each being selectable by the user thereby to forward a particular displayed content item to one or more of the other users.

Preferably said list is displayed in a position dependent on the location of the content item to be transmitted.

Preferably, each content item is provided with an icon, the selection of which opens the list of users.

Preferably, the list is superimposed over the graphical user interface.

More preferably, the list is superimposed over the graphical user interface in a position dependent on the location of the content item being viewed. More preferably, the list is superimposed over the graphical user interface in a position which is proximate to the content item.

Preferably, the content item is forwarded to the other user by "dragging and dropping" the content item onto the graphical icon corresponding to the other user.

Preferably, the graphic icons are in the form of images of the other users.

Preferably, the list is animated.

More preferably, the list is arranged in a substantially circular form which is adapted to rotate when a user hovers a pointing device over the list.

Preferably, the list is represented as a graphical card index, each card of which shows an image corresponding to another user. More preferably, the pages of the card index flip over as a user hovers a pointing device over the card index.

More preferably, the list is in the form of an animated carousel of images (which is sometimes referred to as a Rolodex™).

In accordance with a further aspect of the invention, there is provided a method of providing content for a computer program which allows a user to access content items, the graphical user interface comprising means for displaying particular content items, means for forwarding particular content items to selected other users, and a list of users to which the content may be forwarded represented in the form of a graphic icons each corresponding to another user and each being selectable by the user thereby to forward a particular displayed content item to one or more of the other users.

Interface for a System:

According to a further aspect of the invention there is provided a system for providing content to a user the system comprising: a user interface for providing visual indications of conditions prevailing in said system, wherein said conditions comprise the availability of said content; and wherein said interface comprises: means for generating a display (preferably a display generation module) in dependence on said conditions, said display comprising an array of panes in register with one another at a vertex corresponding to the area in which all the panes meet, each of the panes providing a user with means for accessing a particular functionality of said interface to locate said content; means for detecting the presence of the pointing device over a pane (preferably an input analysis module); and means for changing the size of a pane relative to the other panes (preferably a dynamic display module) in response to said detection; wherein the panes remain in register with one another at the vertex as a pane expands.

Further Aspects:

According to another aspect of the invention, there is provided a graphical user interface for a computer program, the interface comprising an array of main panes each providing access to a particular aspect of the program, the panes being in register with one another at a vertex corresponding to the area in which all the panes meet, each of the panes being adapted to expand relative to the other panes as a pointing device highlights a pane, wherein the panes remain in register with one another at the vertex as a pane expands.

Preferably the expansion is accompanied by a corresponding contraction of the other panes.

Preferably, as a highlighted pane expands it moves towards the centre of a display screen on which the program is executed.

Preferably, as the highlighted pane expands, the vertex moves along a diagonal line towards an outer edge of a display screen on which the program is executed. More preferably, the vertex moves at an angle of 45 degrees.

More preferably, as successive main panes are highlighted the vertex moves along an "x" centred in the middle of the screen.

Preferably, at least a square number of main panes are provided. More preferably, 4, 6, 8, 9 or 12 main panes are provided. In a case where 4 panes are provided there is a single vertex. In a case where more than 4 panes are provided there are multiple vertices.

Preferably, the main panes do not overlap with one another at any time.

Preferably, a plurality of sub-panes are provided within each main pane which exhibit substantially the same behaviour as the main panes. More preferably, each main pane is provided with an array of sub-panes which expand, contract and/or centralise in a substantially similar fashion to the main panes. Hence, the interface is in a sense "fractal" in nature.

Preferably, so long as the pointing device continues to highlight (hover over) a pane, the pane will continue to expand until it reaches a specified maximum size.

Preferably, if a particular pane is selected (by clicking on it) the pane will immediately expand to a full screen size. More preferably, when a pane has been selected, the other panes are shifted to the outer periphery of the display, and the selected pane takes up most of the screen real estate.

Preferably, each of the main panes exhibits a certain amount of animation prior to being selected. More preferably, following selection the panes which have not been selected exhibit reduced animation.

Preferably, following selection of one of the main panes the panes which have not been selected exhibit reduced opacity. More preferably, following selection, the selected pane will exhibit increased opacity.

Preferably, the relative positions of the panes to one another do not change.

Preferably, the graphical user interface could be applied to any graphical menu, for example, for a media player and/or a content viewer. In one embodiment the interface may provide a catch-up TV/radio application or a video on-demand or near on-demand application. The graphical user interface is also particularly suitable for use on mobile devices such a mobile telephones. Preferably, this is accessed by selecting a particular sub-pane within the one of the main panes. When selected this opens a calendar viewer which allows a user to select particular days in the past and then to access a selection of content that had been broadcast on those days, or to select a future day and to select content to be downloaded after broadcast (i.e. a booking system).

Preferably, the user interface operates in a fractal-like manner—i.e. wherein the movement of a pointing device causes the expansion, contraction and/or centralisation of panes or sub-panes in a currently selected pane, and the main pane, while intermediate panes are shown in a tree structure.

Preferably, the tree structure displays a set of cascaded windows all of which terminate on the same lower edge of the main pane (unlike a known cascade of windows) so as not to obscure the other main panes.

Preferably, animations such as slide shows etc. may be shown in the one or more of the main panes prior to selecting a particular main pane. More preferably, once you select a main pane the other panes move to the edges of the selected main pane and are then relatively inactive (although they do "float" about slightly).

Preferably, the interface could have more than four main panes—so long as the number of panes is chose so as to allow the screen to be displayed with a selected main pane in the centre, and with the other panes positioned around the edges of the selected main pane. For example, you could easily have 6, 8, 9 or 12 main panes, which would allow the un-selected panes to be positioned around the main selected pane in a simple and relatively easy to view fashion.

Preferably, the panes are in the form of rectangles or squares. Alternatively, the panes are in the form of other geometric shapes, such as triangles.

Preferably, a "square number" of sub-panes are provided within each main pane.

Preferably if the number of panes or sub panes is not a square number a pane or sub-pane is provided which provides access to further panes or sub-panes Preferably, the panes are provided on a graphical background. More preferably, the background graphic may be selected by a user.

Preferably, the main panes expand and move/centralise around a square in the centre of the screen, the size of which is proportional to a factor of 1.6 times the size of an unexpanded main pane.

Preferably, the panes expand to 1.6 times their size when hovered over.

Preferably, each content item which may be viewed using the user interface provides a "send to a friend" icon. When this is selected an animated selection of images corresponding to a list of friends or buddies is superimposed over the user interface and it is possible to "drag and drop" the selected content item onto a particular image to effect the transmission of the content to the friend.

According to another aspect of the invention, there is provided a method for providing content to a user, the method comprising: providing a graphical user interface for a computer program, the interface comprising an array of main panes each providing access to a particular aspect of the program, the panes being in register with one another at a vertex corresponding to the area in which all the panes meet, each of the panes being adapted to expand as a pointing device highlights a pane, wherein the panes remain in register with one another at the vertex as the pane expands.

According to another aspect of the invention, there is provided a computer program product for providing content to a user, the product including a graphical user interface for, the interface comprising an array of main panes each providing access to a particular aspect of the program, the panes being in register with one another at a vertex corresponding to the area in which all the panes meet, each of the panes being adapted to expand as a pointing device highlights a pane, wherein the panes remain in register with one another at the vertex as the pane expands.

The invention also provides in any aspect not only a method, a graphical user interface and an interactive content guide, but also a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

A reference to a method of providing of content may be interchanged with a reference to a method of use of a (preferably interactive) graphical user interface for display of content.

DESCRIPTION OF THE DRAWINGS

The invention will now be described, by way of example only, with reference to the attached figures, in which.

By way of an example implementation, described below with reference to FIGS. 1 to 31 is an interactive media player graphical user interface allowing a user to access television and radio accessible over a digital communications channel. The facility illustrated includes a 'catch-up' TV/radio application described in WO2005/125200, whose content is hereby incorporated by reference, providing viewers with the opportunity to use an interactive website to catch up on TV and radio programmes that they may have missed for a prescribed time (e.g. up to seven days) after they have been broadcast, using the Internet to download programmes to their home computers. The system uses peer to peer distribution technology (P2P) to distribute the programme content. Digital Rights Management (DRM) software incorporated into the system provides that at the prescribed time after the programme transmission date the programme file expires and users will no longer be able to access it, as well as preventing users from saving or sharing the files.

This example, then, involves a system accessible by way of a user's general-purpose computer, whereby navigation and selection of content is carried out by use of the computer mouse controls. However, it will be realised that the invention may be implemented by way of any suitable display device and control device. For example, the display device and control device may be integrated into a touchscreen system. Suitable control devices include joysticks, trackwheels, pointers, remote controls, etc. The interface of the invention may be used for navigating and accessing any form of data content, and examples include games menus, digital camera and video camera controls, DVD and STB viewing and control options, and digital photograph, audio and video collections.

Figure 1:
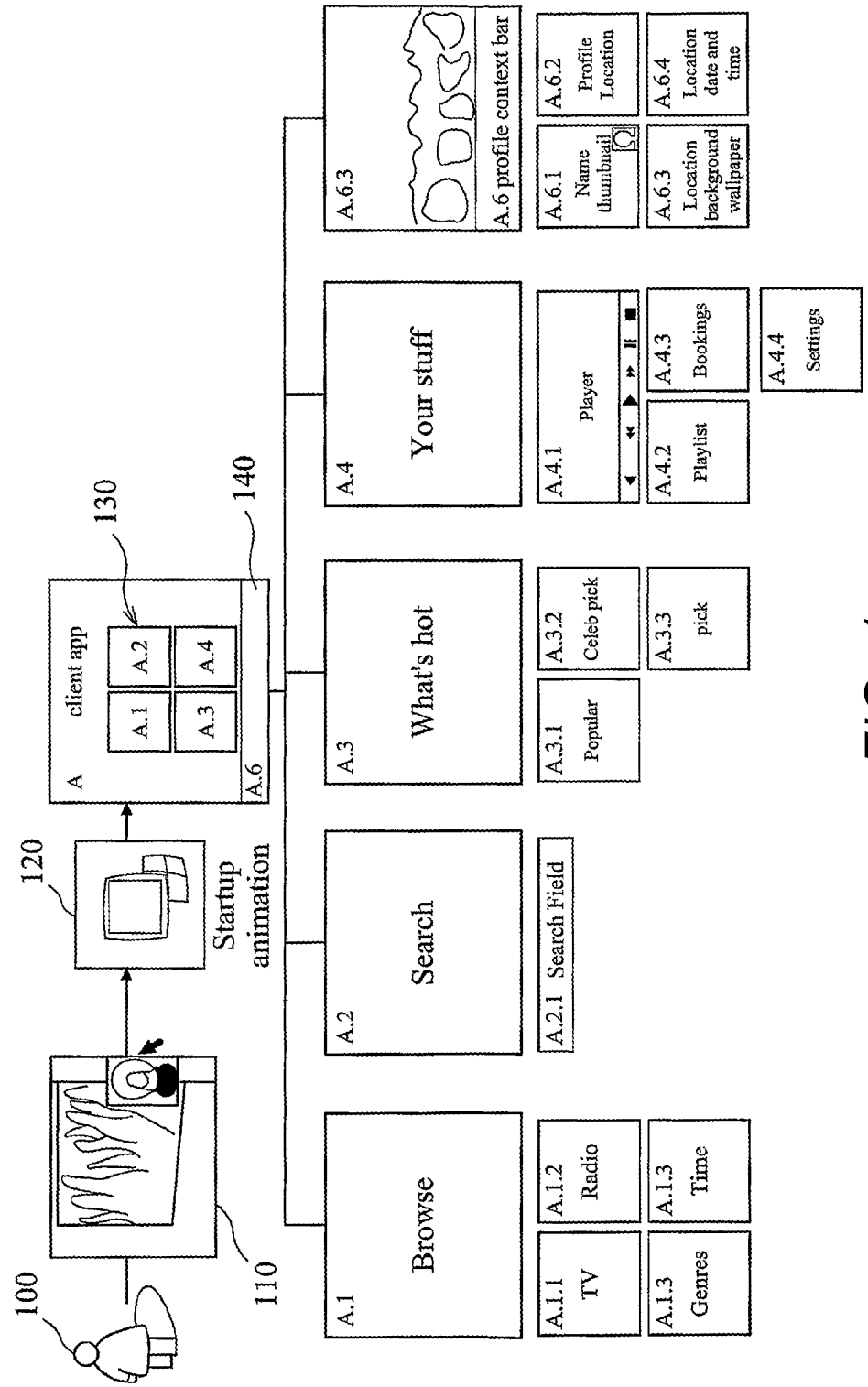
FIG. 1 is a simplified high level functional diagram illustrating operation and functionality of an embodiment of an interface of the invention.
Figure 2:
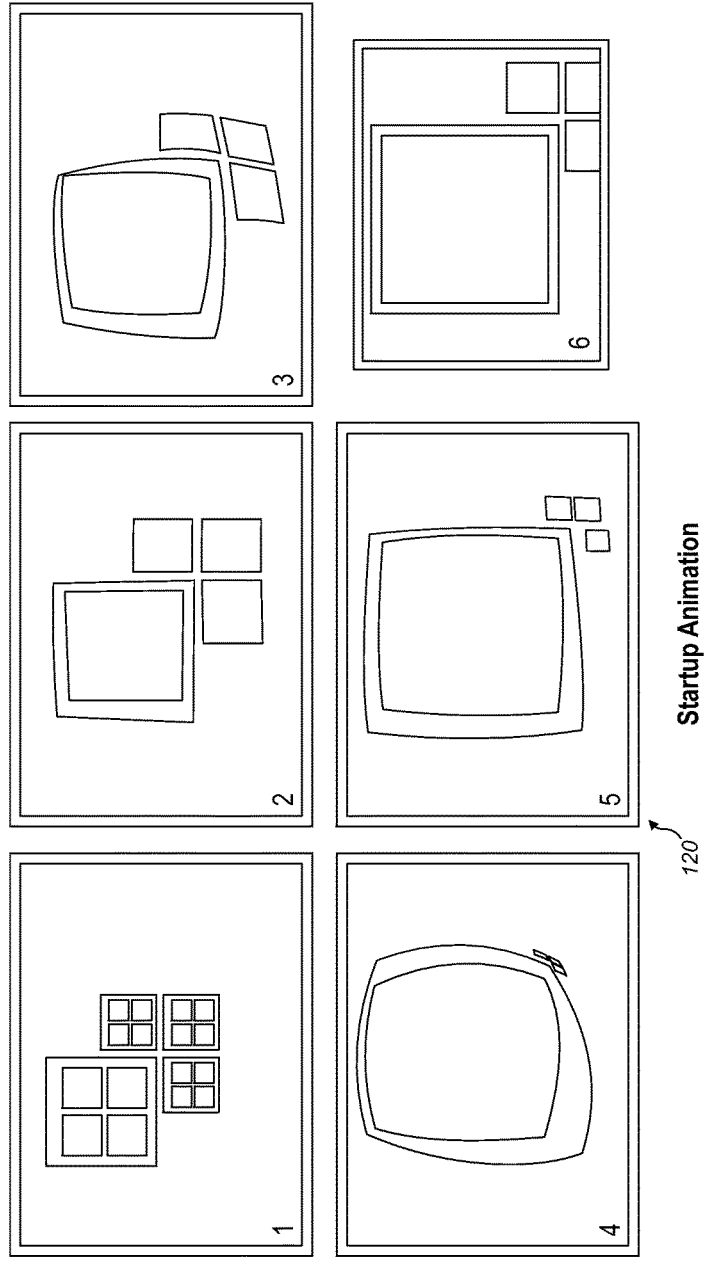
FIG. 2 is a sequence of images illustrating stages in a start-up sequence for the interface of FIG. 1.

The interface of the invention is highly behavioural. As FIG. 1 illustrates, at the top level, it involves just four directories or options; Browse, Search, What's Hot and Your Stuff. On accessing the system at step 110 (by clicking on a startup icon) the application opens and a startup animation 120 (FIG. 2) runs, until the application display takes over the entire screen estate (or alternatively can run over an existing desktop alongside other applications). Through the startup animation, the user 100 is presented with a display of four square sub-panes or quadrants (A.1-A.4) which together make up one big square 130 in the rest/default position of the display. The animation provides that the four quadrants rapidly appear on the screen from the horizon, initially small in size and with zero opacity, until they reach their rest position with hundred percent opacity. A user-defined application wallpaper can appear in the display background.

Each quadrant represents one of the key building blocks of the application, respectively Browse (A.1), Search (A.2), What's Hot (A.3) and Your Stuff (A.4). A profile context bar 140 (A.6) is also provided at a suitable location, for example at the bottom edge of the display screen.

The user navigates the top level quadrants by moving the mouse and passing a mouse pointer over any one of them and clicking on a single item to go directly to that item, or clicking on a second level of a quadrant to access each of the sub-sections. A similar navigation structure is provided at every level within the application. The navigation is only four levels deep at maximum.

The application is built on the following structure:
<Familytype: e.g.: Quadrant 1, 2, 3, 4>
   <parent 1.1>+<promoted child objects on this level>
     <parent 1.1.1>+<promoted child objects on this level>
       <parent 1.1.1.1>+<child objects part of a series>

The quadrants react dynamically to user interaction by way of mouse movement and change size accordingly. As the mouse pointer passes over any quadrant, it expands in size dynamically from its rest position. If the mouse pointer remains over that quadrant, it continues to expand until it reaches a prescribed maximum size. As that quadrant increases in size, the other three quadrants undergo a commensurate decrease in size to make way for the screen estate taken up by the moused quadrant. Each peripheral quadrant thus becomes relatively compact and moves towards the edges of the overall display. However, it is important to realise that all quadrants remain available for mouse selection (in a single click), no matter how deep the user may be in the navigation within a particular other quadrant. For example, if the user is in Browse>Genres>Comedy>The Office (see the sample screenshot of FIG. 16) and decides to move to Search, he or she simply navigates over and clicks on the Search quadrant to the bottom right of the screen. The Browse quadrant then contracts to become more compact, and moves to the left hand edge of the screen, continuing to display in its compact form the state where the user previously was (i.e. Browse>Genres>Comedy>The Office).

If the user clicks within a particular quadrant, the selected quadrant is presented to the user in a prescribed manner indicating its selection. For example, the quadrants may move around the display screen so that the selected quadrant arrives in a particular position, whilst the remaining three quadrants become yet more compact and take a yet more peripheral position on the display. Importantly, the user can still readily access any of the other quadrants by one click of the mouse on the compacted peripheral quadrants. In other words, the user does not lose access to any quadrants in the level to which they have browsed. Once the user has selected a particular quadrant in which to navigate, he or she can then go directly to a single content item. In a preferred form, the main directories Browse, Search, What's Hot and Your Stuff are always presented to the user in the same relative orientation, as the figures illustrate This navigation structure is represented in the functional level diagram of FIG. 3 and exemplified in the screenshot of FIG. 4. In this example, the user's mouse is hovering over the Your Stuff quadrant, which comprises a media player area A.4.1, a playlist area A.4.2, a bookings area A.4.3, and a settings area A.4.4. A video is playing in the player area, being the video most recently played by the application. The rules and behaviours that govern the Your Stuff navigation are as follows:

A.4.1 A/V Player. The player has no controls displayed whilst the video is playing, but on rolling the mouse over this area the controls Play, Fwd, Rwd and Volume appear superimposed on the player, for use by the user. If the user double clicks on a playing video, it switches to full screen.

A.4.2 Playlist. The playlist comprises a library where all of the users downloaded files are stored. A file download progress indicator appears within the playlist area.

A.4.3 Bookings. This comprises an area in which any user bookings for future series are displayed.

A.4.4 Settings. This comprises an area in which the user can manipulate settings for the application.

Figure 3:
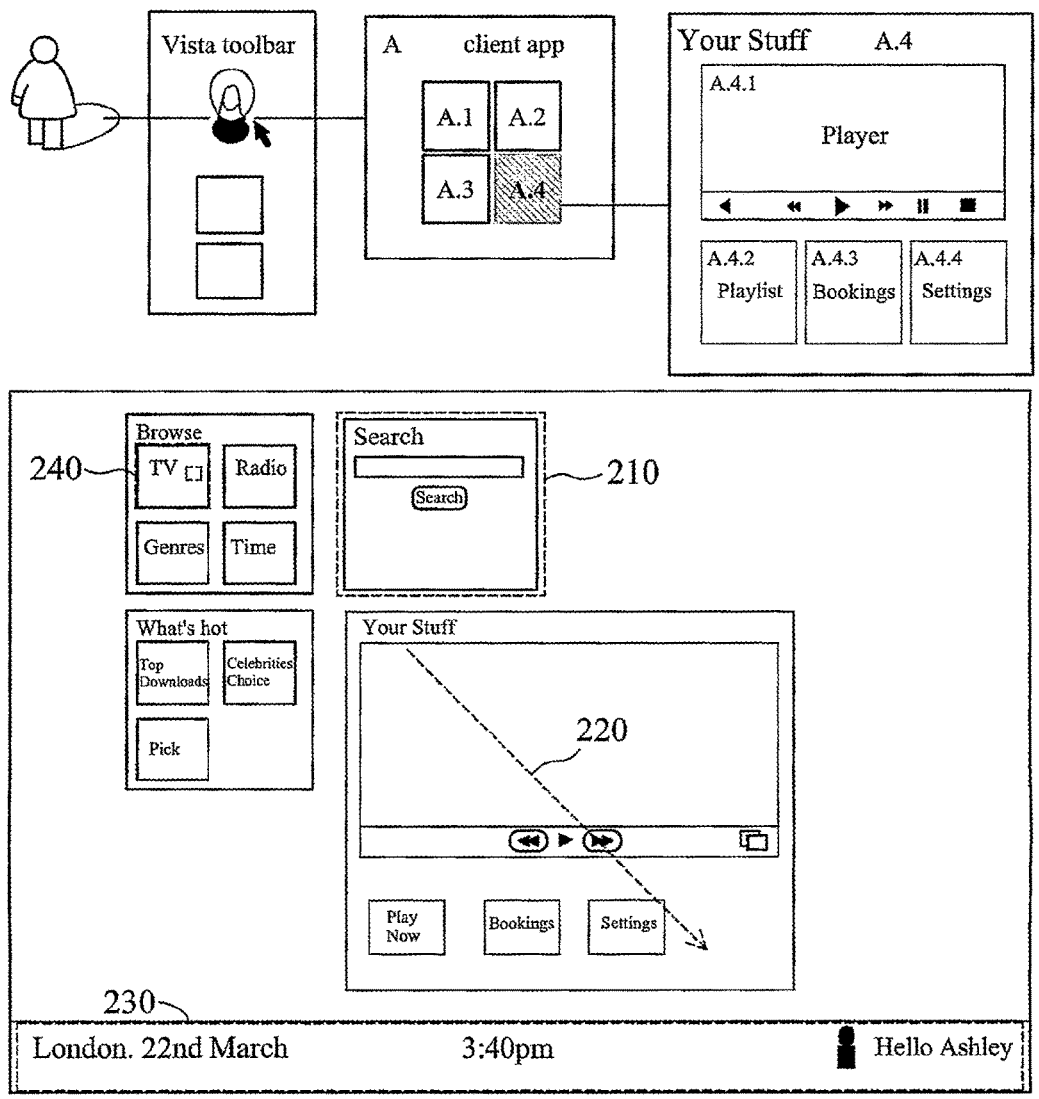
FIG. 3 is a simplified functional level diagram illustrating operation and functionality of a 'Your Stuff' aspect of the interface of FIG. 1.
Figure 4:
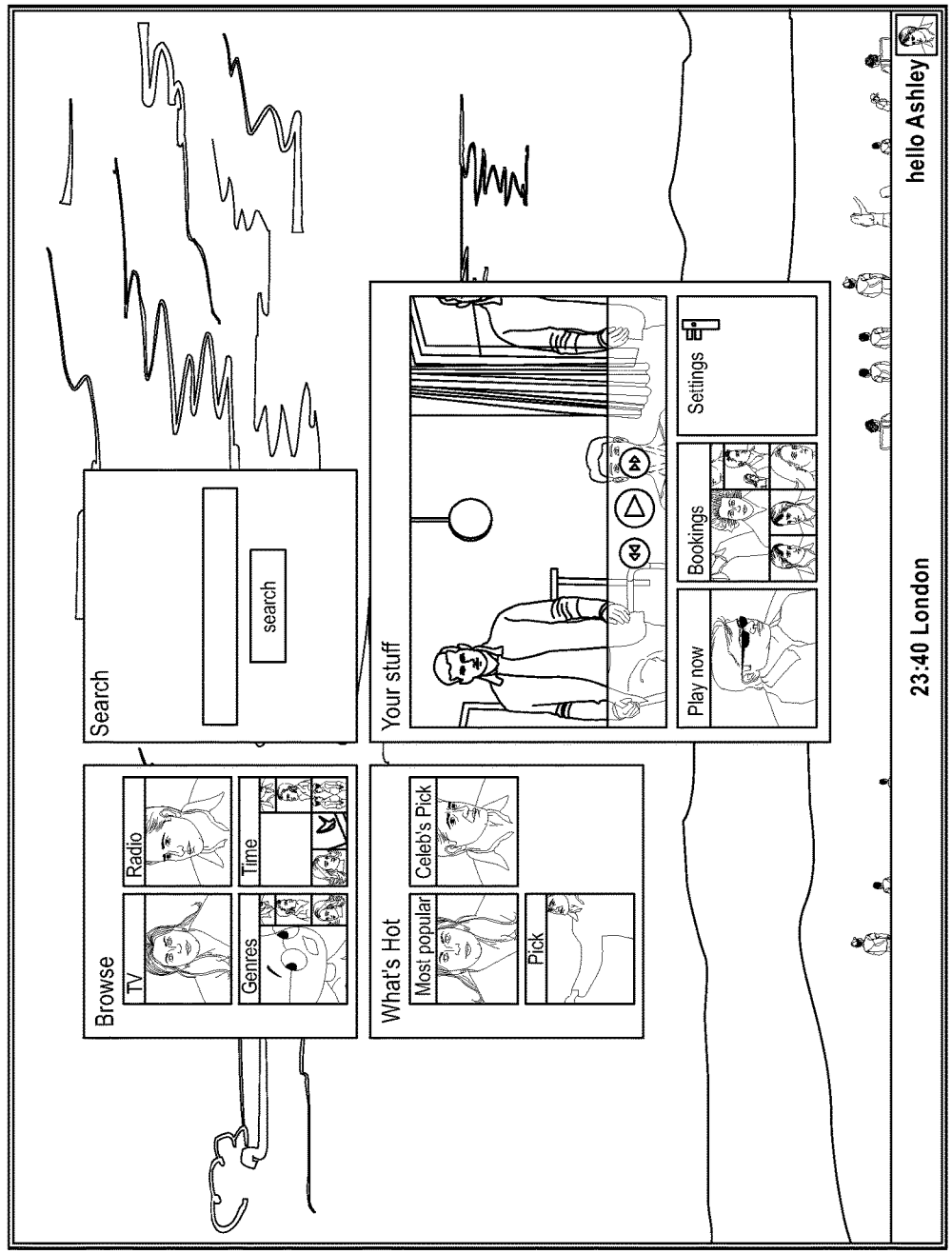
FIG. 4 is an exemplary screen shot illustrating the functionality represented in FIG. 3.
Figure 5:
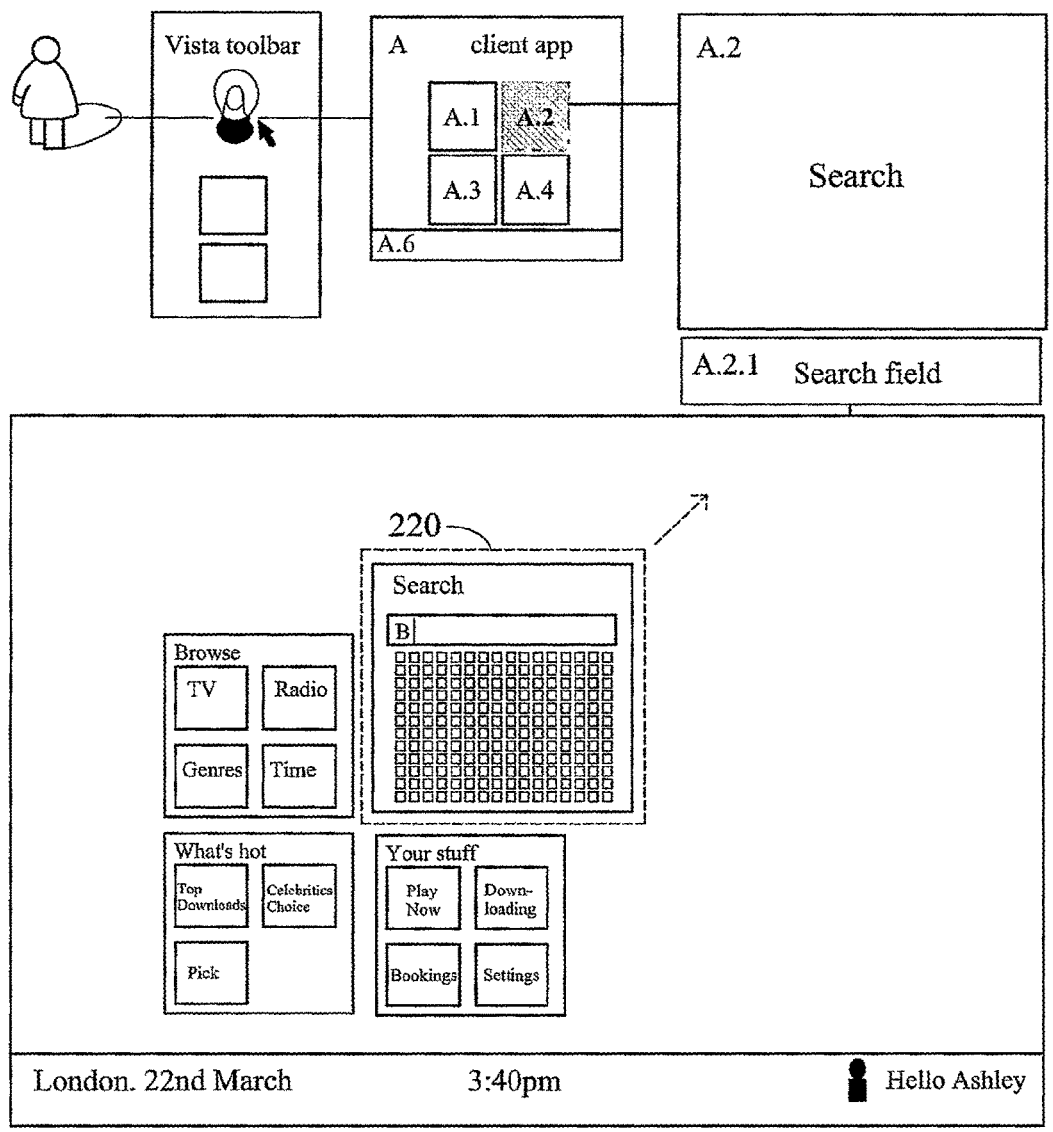
FIG. 5 is a simplified functional level diagram illustrating operation and functionality of a 'Search' aspect of the interface of FIG. 1.

In FIG. 3, certain global behaviours 210, 220, 230, 240 of the application are illustrated as follows:

Global behaviour 1. In a first global behaviour 210, all quadrants (which may also be referred to as containers) are slowly pulsing (continuously expanding and contracting) and moving in space, the square aspect ratio being maintained.

Global behaviour 2. In a second global behaviour 220, on mousing (moving an onscreen pointer) over any one container (quadrant), the container expands in size. As the expanding container grows the other containers shrink. If any animation occurs within an expanded container, the remaining smaller containers stop pulsing.

Global behaviour 3. In a third global behaviour 230, The profile context bar (A.6) appears on startup and then disappears at the bottom of the screen. When the user moves the pointer back to the bottom edge of the screen, the context bar reappears.

Global behaviour 4. In a fourth global behaviour 240, as the user mouses over thumbnails within a particular container, the focus line has a pulsating border around that object. The cursor becomes a finger, to indicate that it is an active area.

The interface provides a facility whereby a user may search for a content item and navigate directly and simply to the required result. This functionality is provided by a search field area A.2.1, and operation thereof is represented in the functional level diagram of FIG. 5, and exemplified in the screenshot of FIG. 6.

Figure 6:
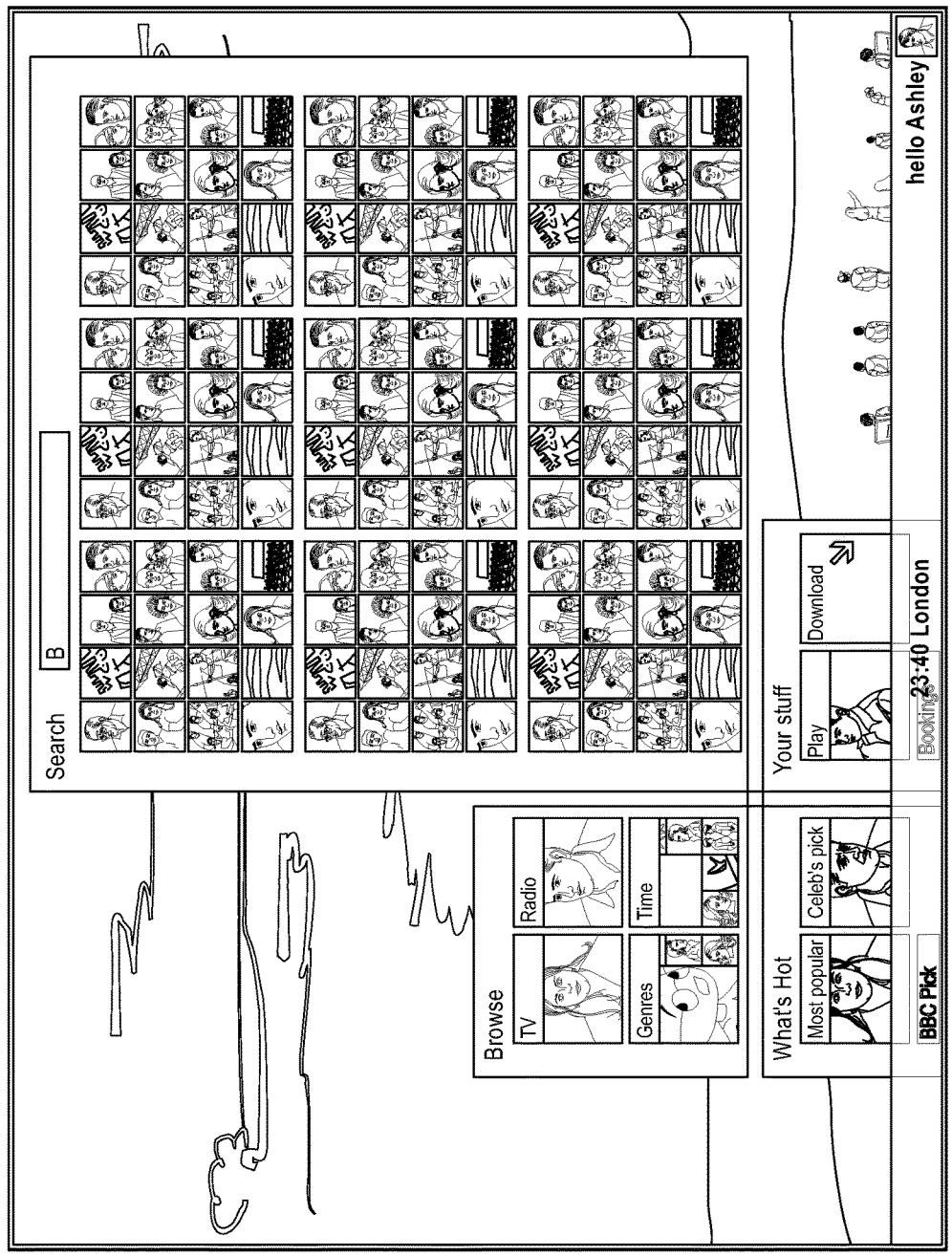
FIG. 6 is an exemplary screen shot illustrating the functionality represented in FIG. 5.

The user selects the Search quadrant A.2, and brings the cursor to the search field A.2.1 within this quadrant. The user then begins typing text into the field. As illustrated in FIG. 6, a plurality of images appears, all corresponding to the search term entered. In the example, the letter 'B' has returned a great many TV and radio programs (144 in total), all of which are represented by the large number of tiled icons or thumbnails in the expanded search quadrant. Hence, the user does not need to scroll down a results list to find the desired result, as all records returned by the search are shown. The greater the number of items corresponding to the search term, the smaller the size of each icon or thumbnail. As the user continues to enter text, the search results are further refined by narrowing down the number of returns.

Figure 7:
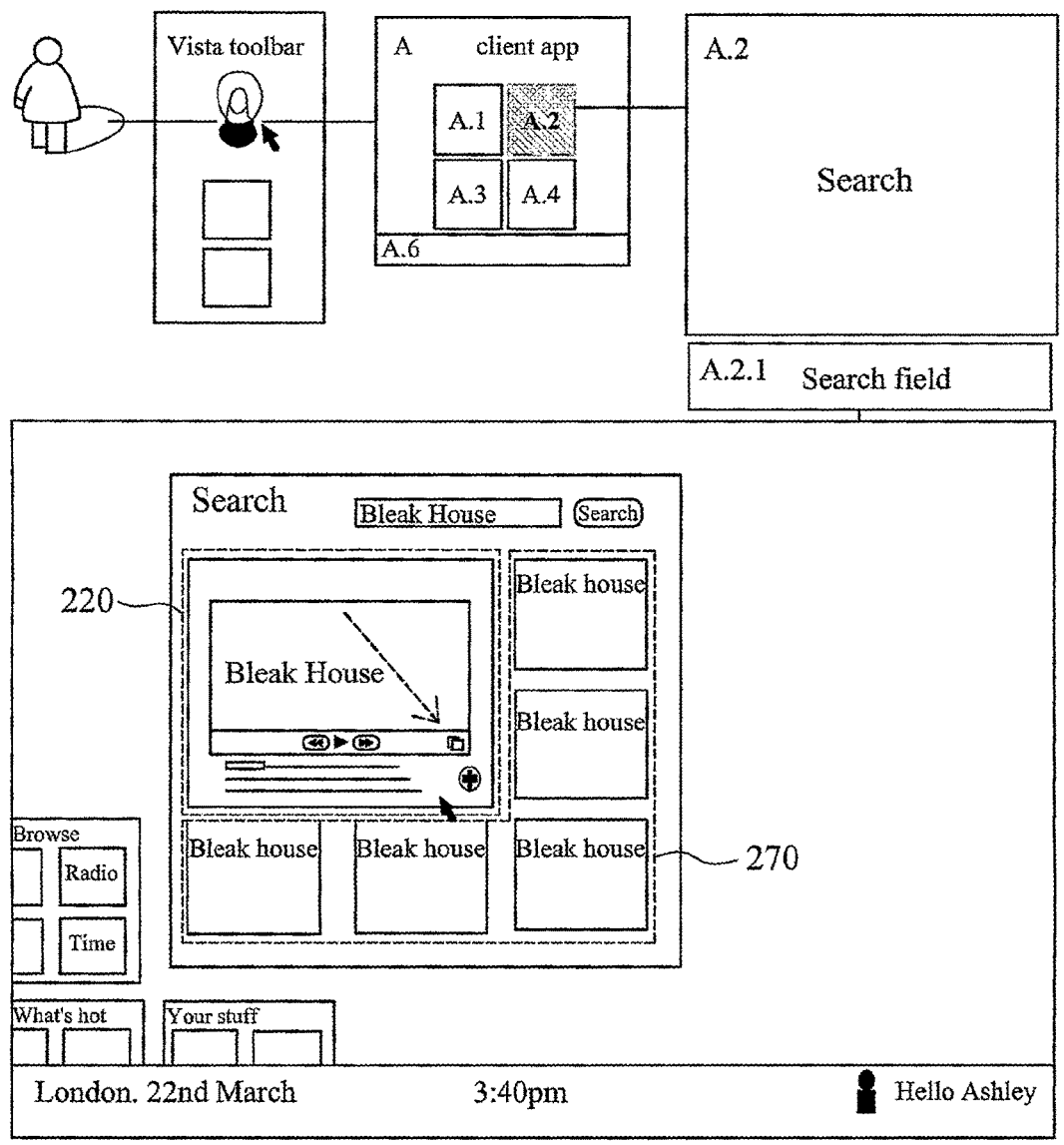
FIG. 7 is a simplified functional level diagram further illustrating operation and functionality of the aspect represented in FIG. 5.
Figure 8:
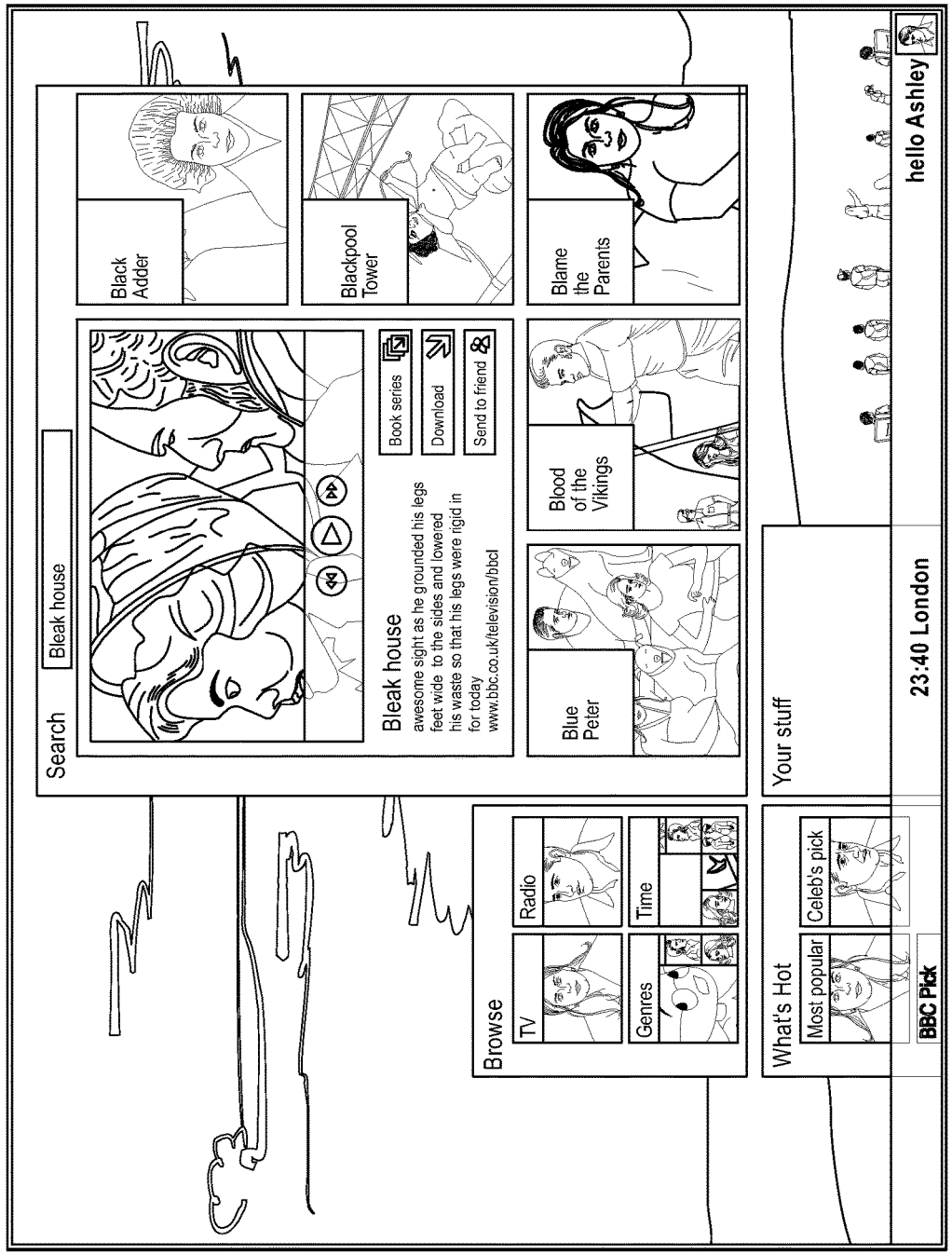
FIG. 8 is an exemplary screen shot illustrating the functionality represented in FIG. 7.

The result of this 'search results sorting behaviour' is shown in FIG. 7 at 270 and is further exemplified in the screen shot of FIG. 8. The search string "Bleak house" has returned the most recent episode of the relevant TV series. On mousing over this area, and in accordance with the global behaviour discussed above, the area expands, the next most relevant search results ("Black Adder", "Blackpool Tower", etc.) are relegated to compacted peripheral areas 270, and the user is presented with a player and options for selection, such as booking the series or downloading it.

Figure 9:
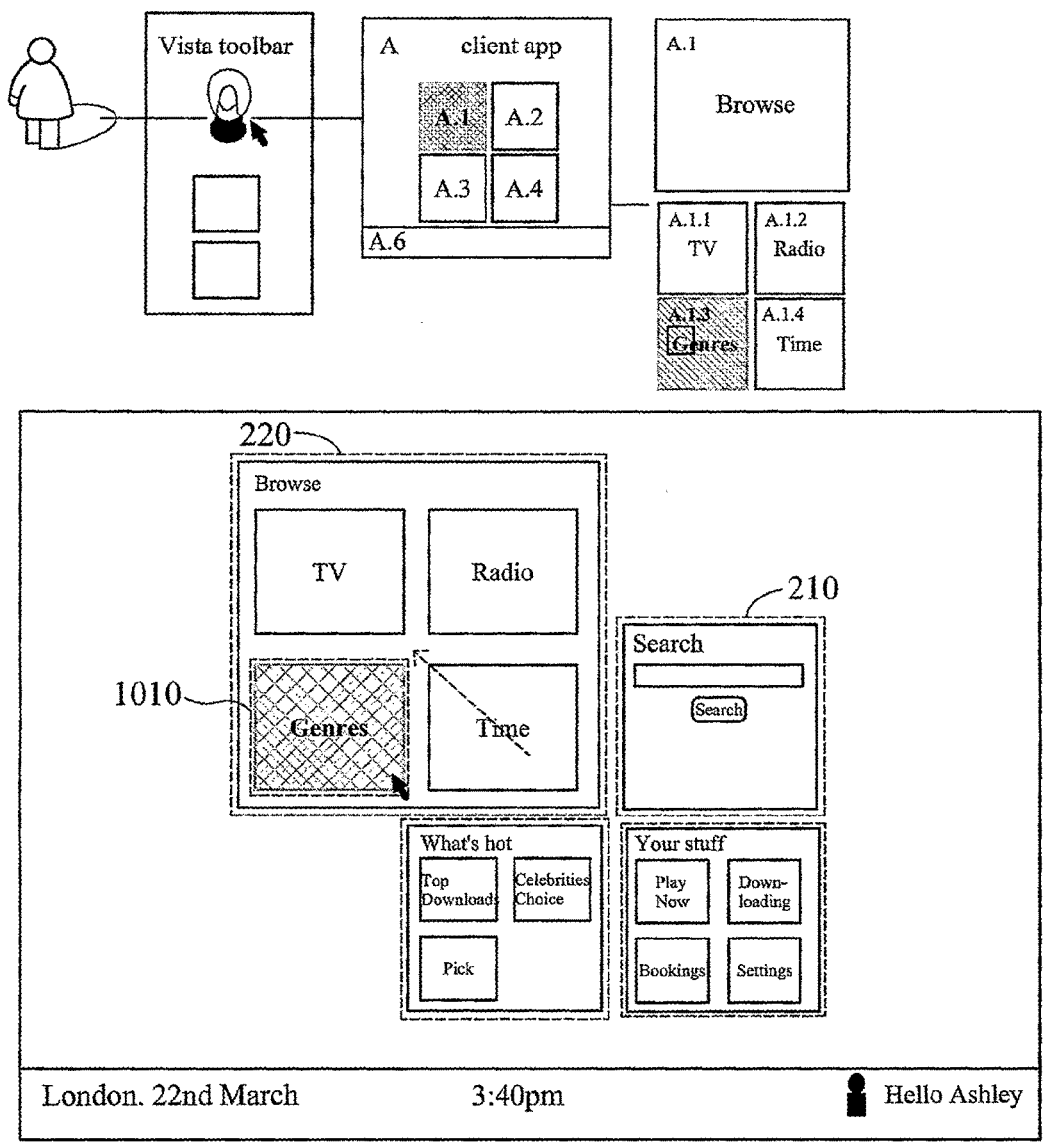
FIG. 9 is a simplified functional level diagram illustrating operation and functionality of a 'Browse' aspect of the interface of FIG. 1.
Figure 10:
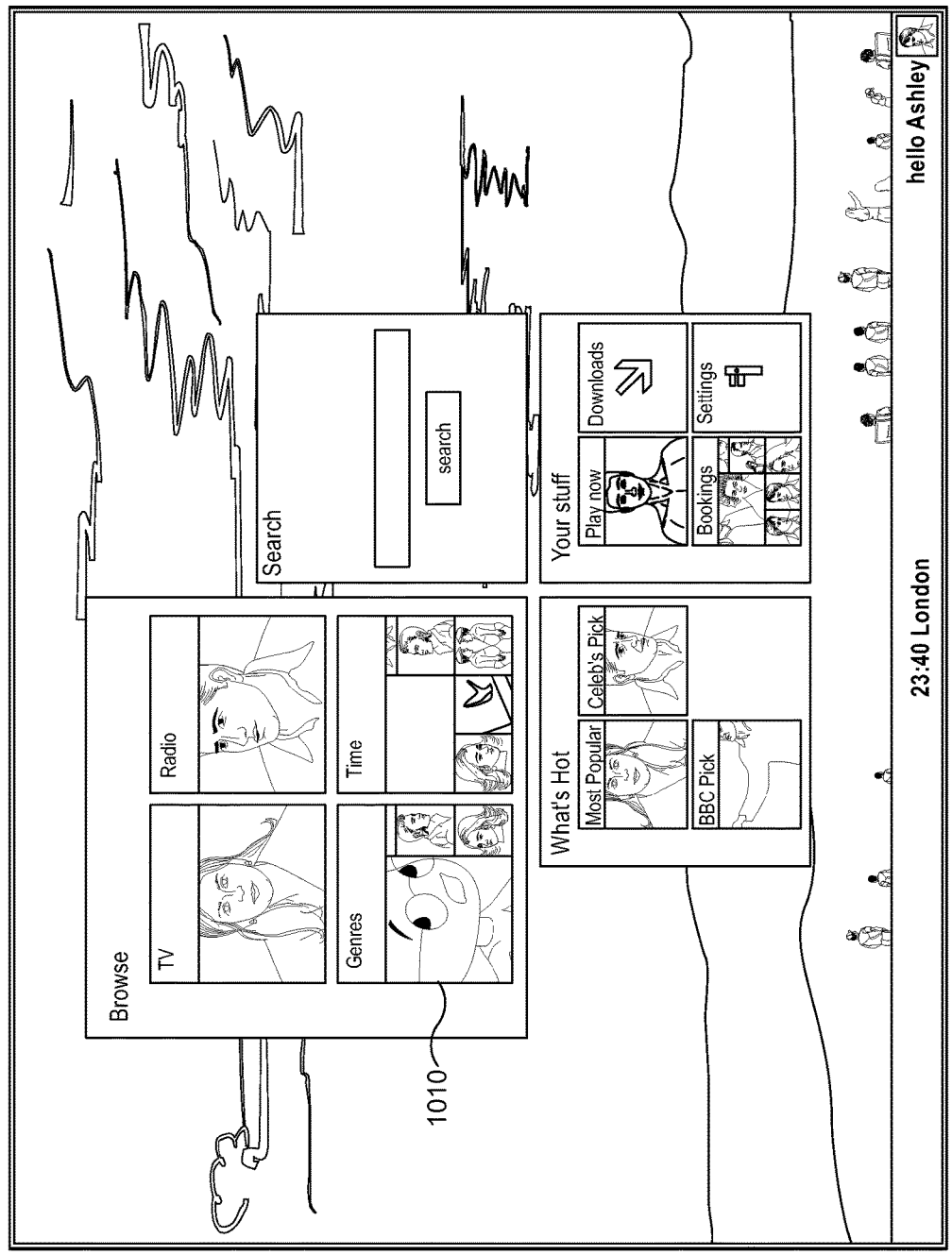
FIG. 10 is an exemplary screen shot illustrating the functionality represented in FIG. 9.

Turning to the Browse quadrant A.1 and its navigation, the operation thereof is represented in the functional level diagram of FIG. 9 and exemplified in the screenshot of FIG. 10. Browse quadrant A.1 comprises four sub-areas TV, Radio, Genres and Time, respectively A.1.1 to A.1.4.

Figure 11:
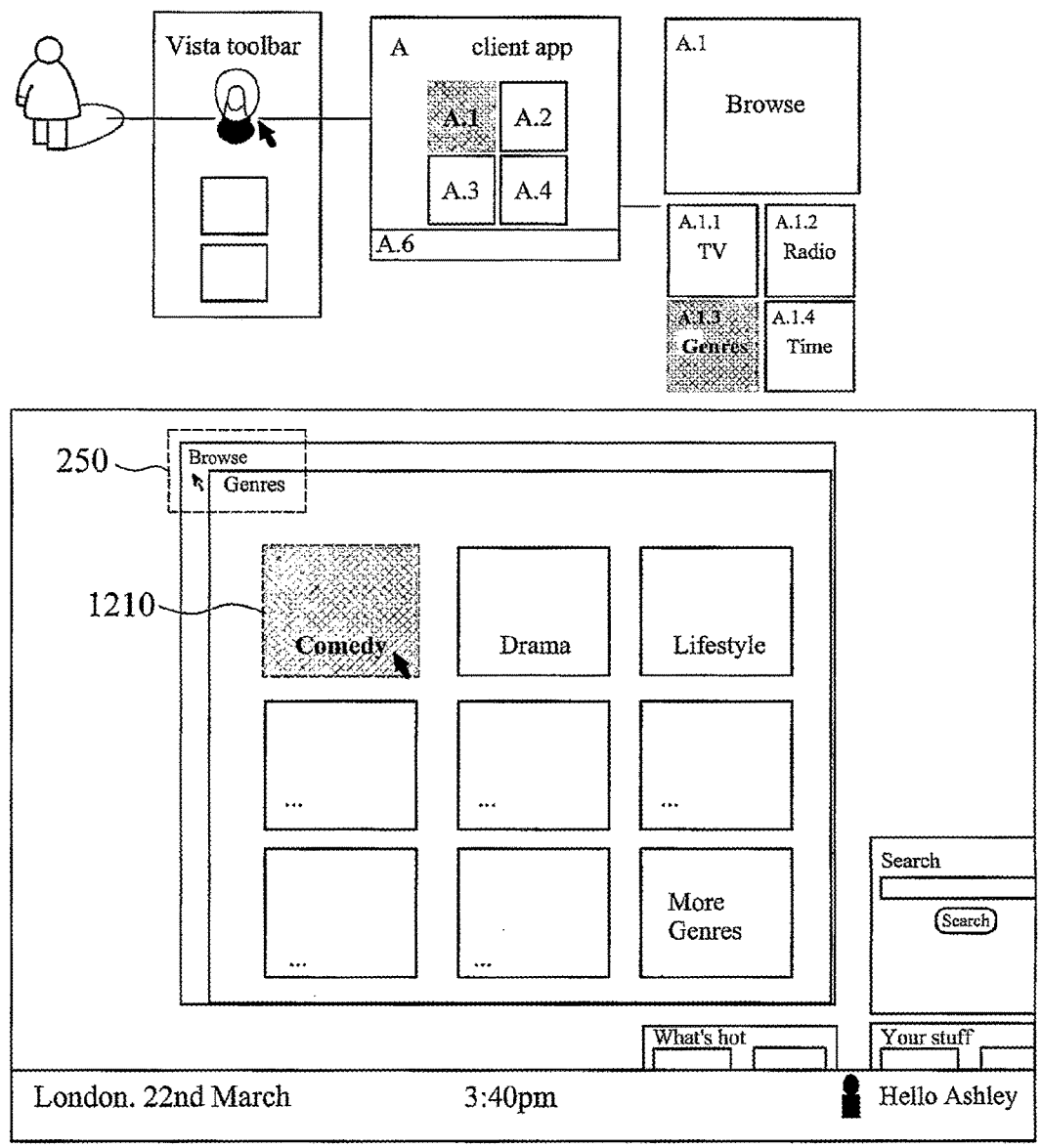
FIG. 11 is a simplified functional level diagram further illustrating operation and functionality of the aspect represented in FIG. 9.
Figure 12:
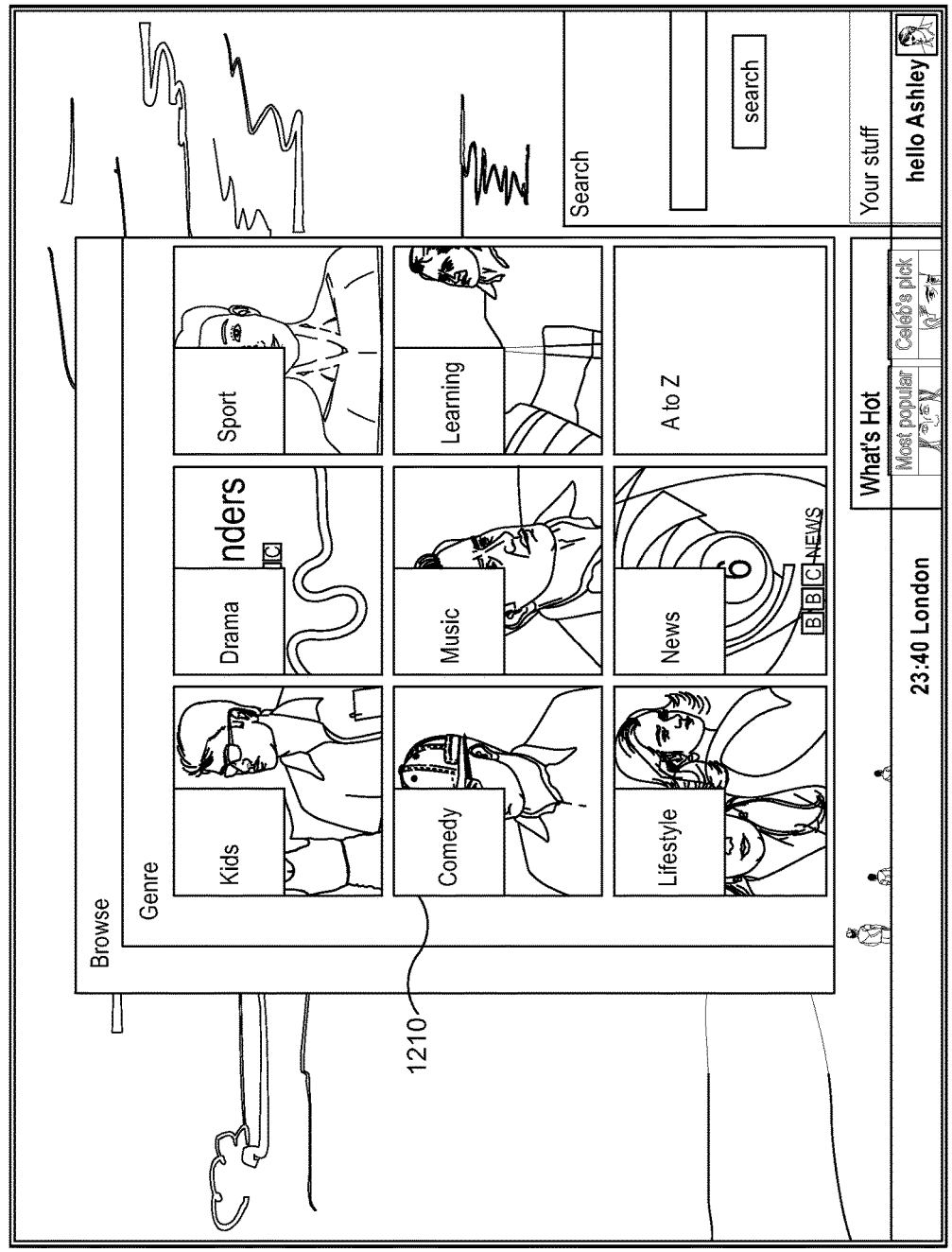
FIG. 12 is an exemplary screen shot illustrating the functionality represented in FIG. 11.
Figure 13:
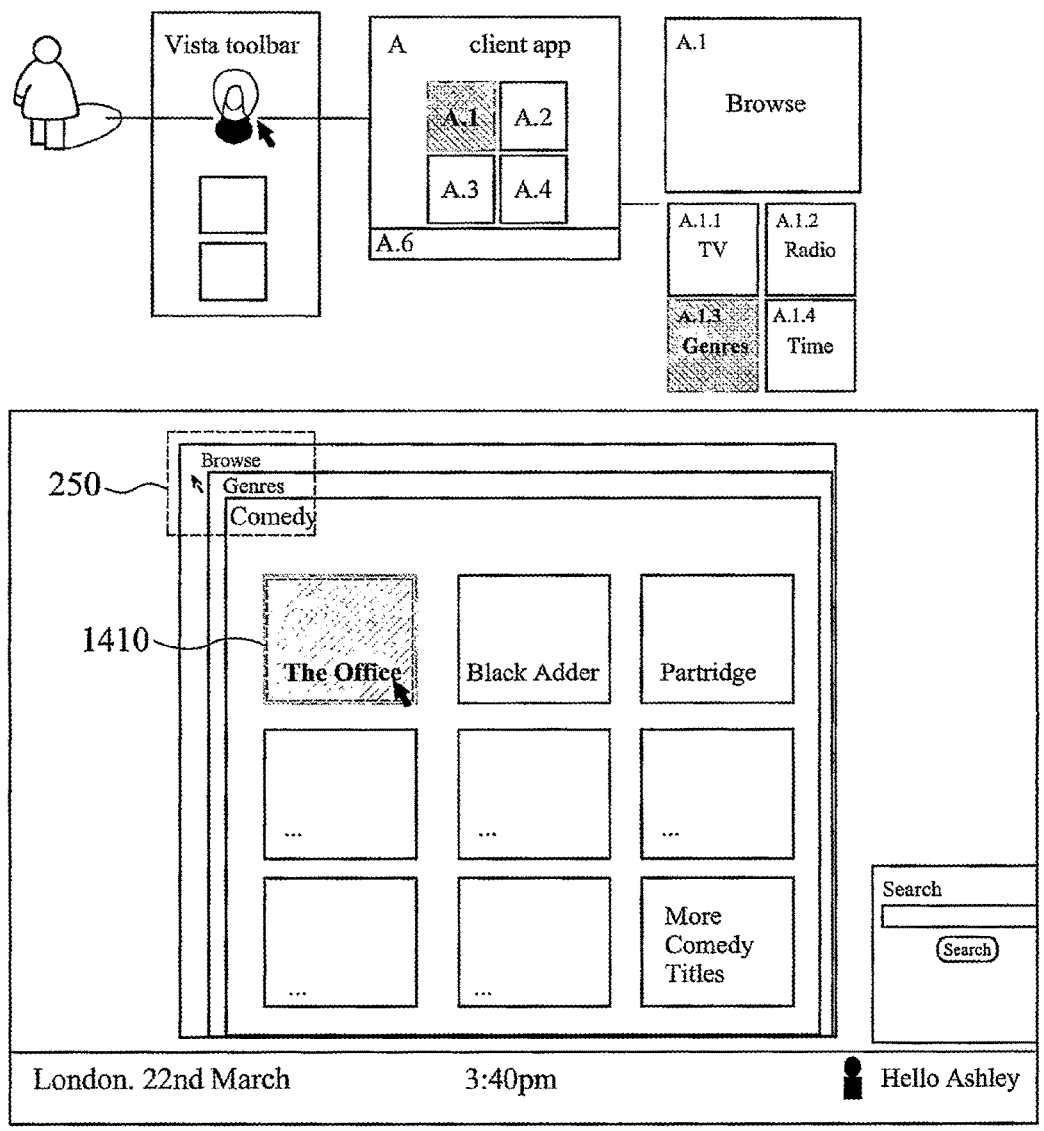
FIG. 13 is a simplified functional level diagram still further illustrating operation and functionality of the aspect represented in FIG. 9.
Figure 14:
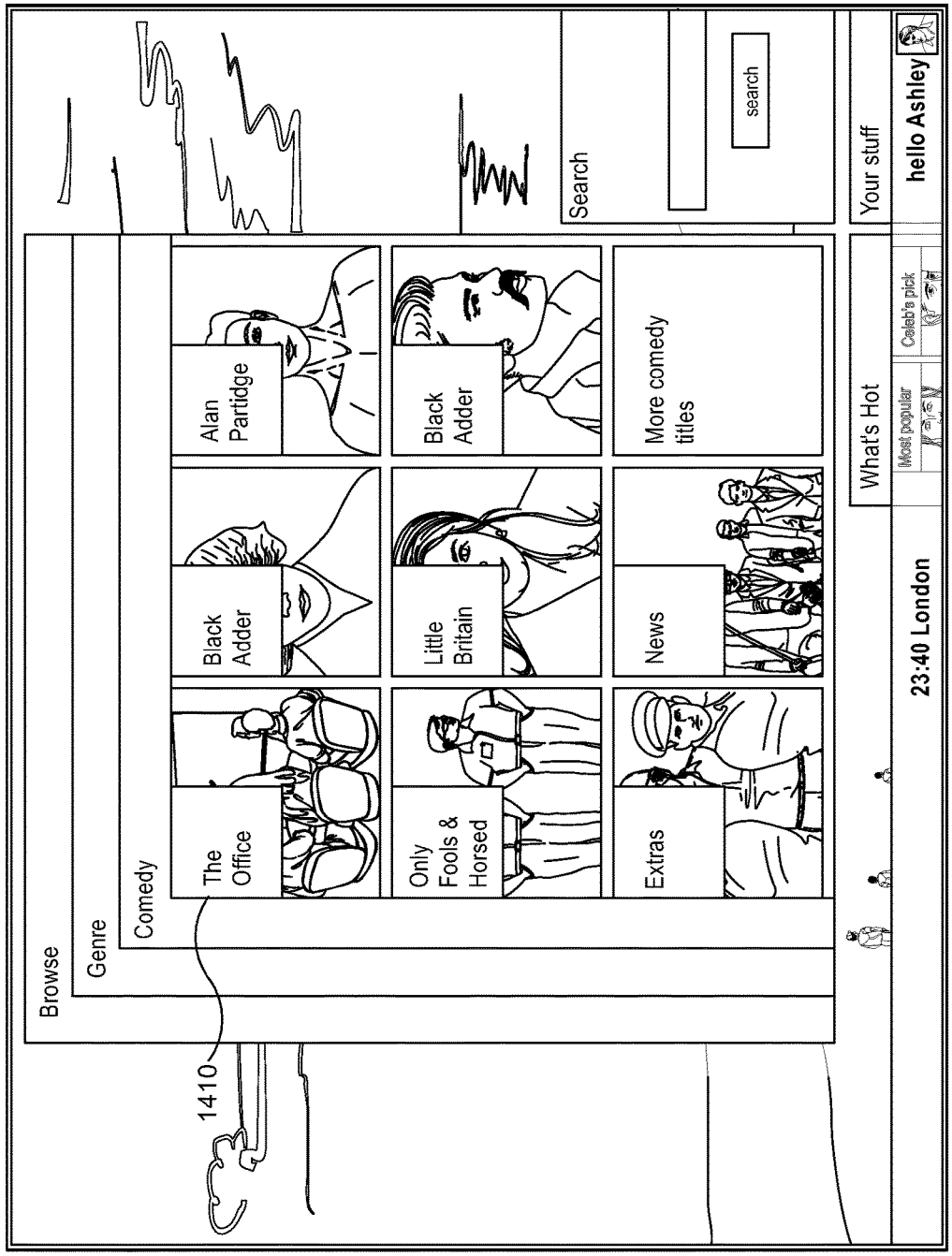
FIG. 14 is an exemplary screen shot illustrating the functionality represented in FIG. 13.
Figure 15:
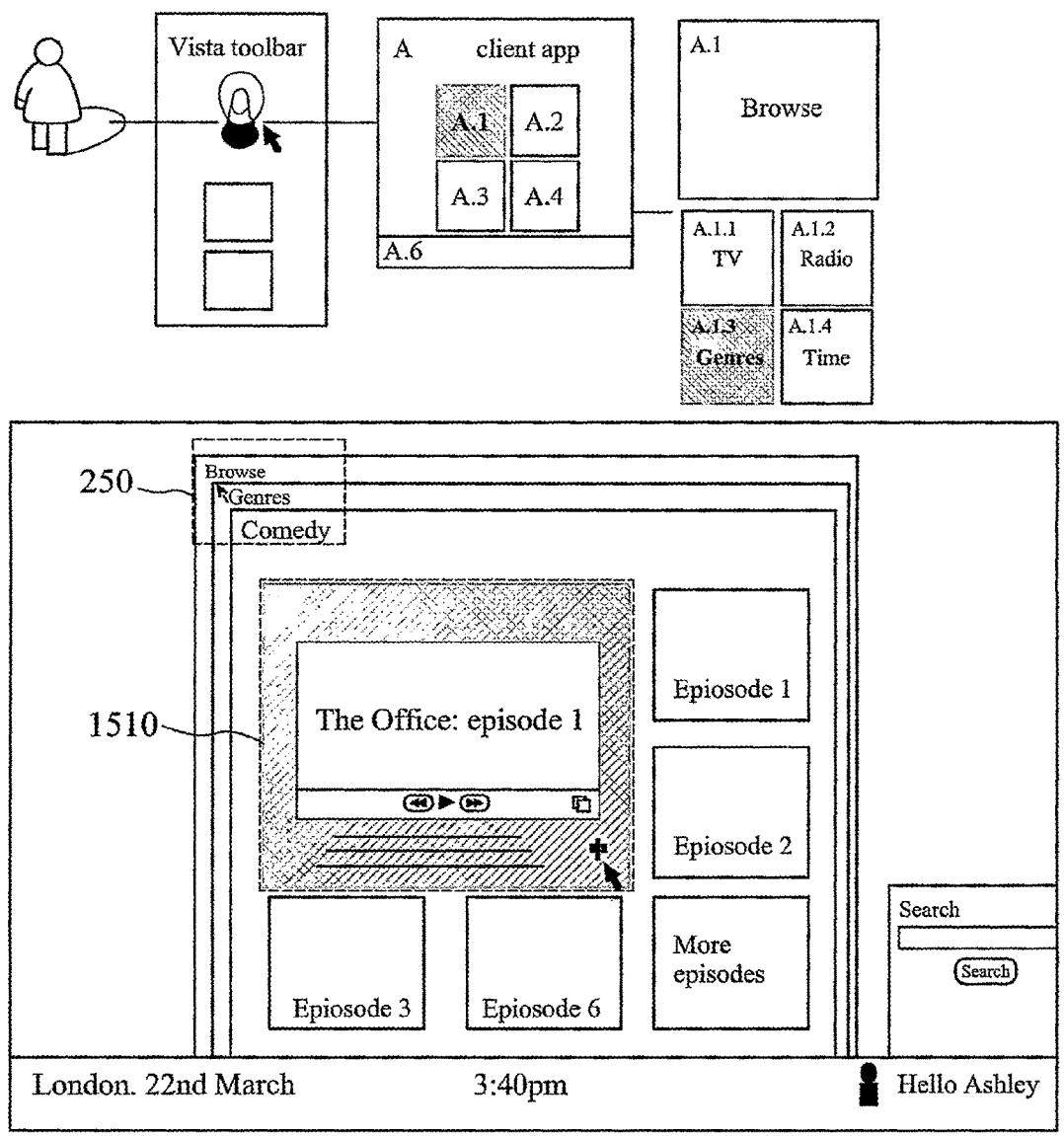
FIG. 15 is a simplified functional level diagram still further illustrating operation and functionality of the aspect represented in FIG. 9.
Figure 16:
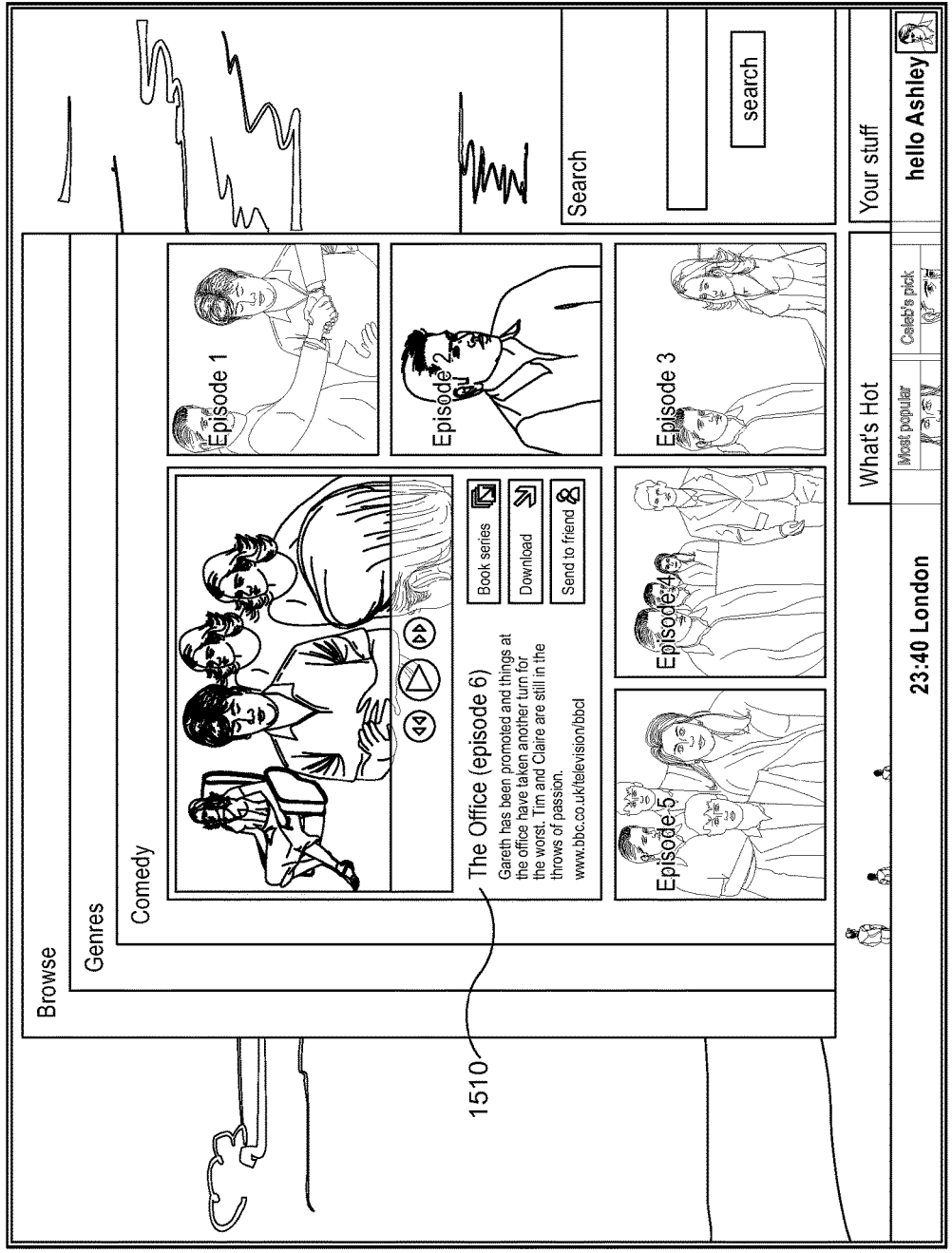
FIG. 16 is an exemplary screen shot illustrating the functionality represented in FIG. 15.
Figure 17:
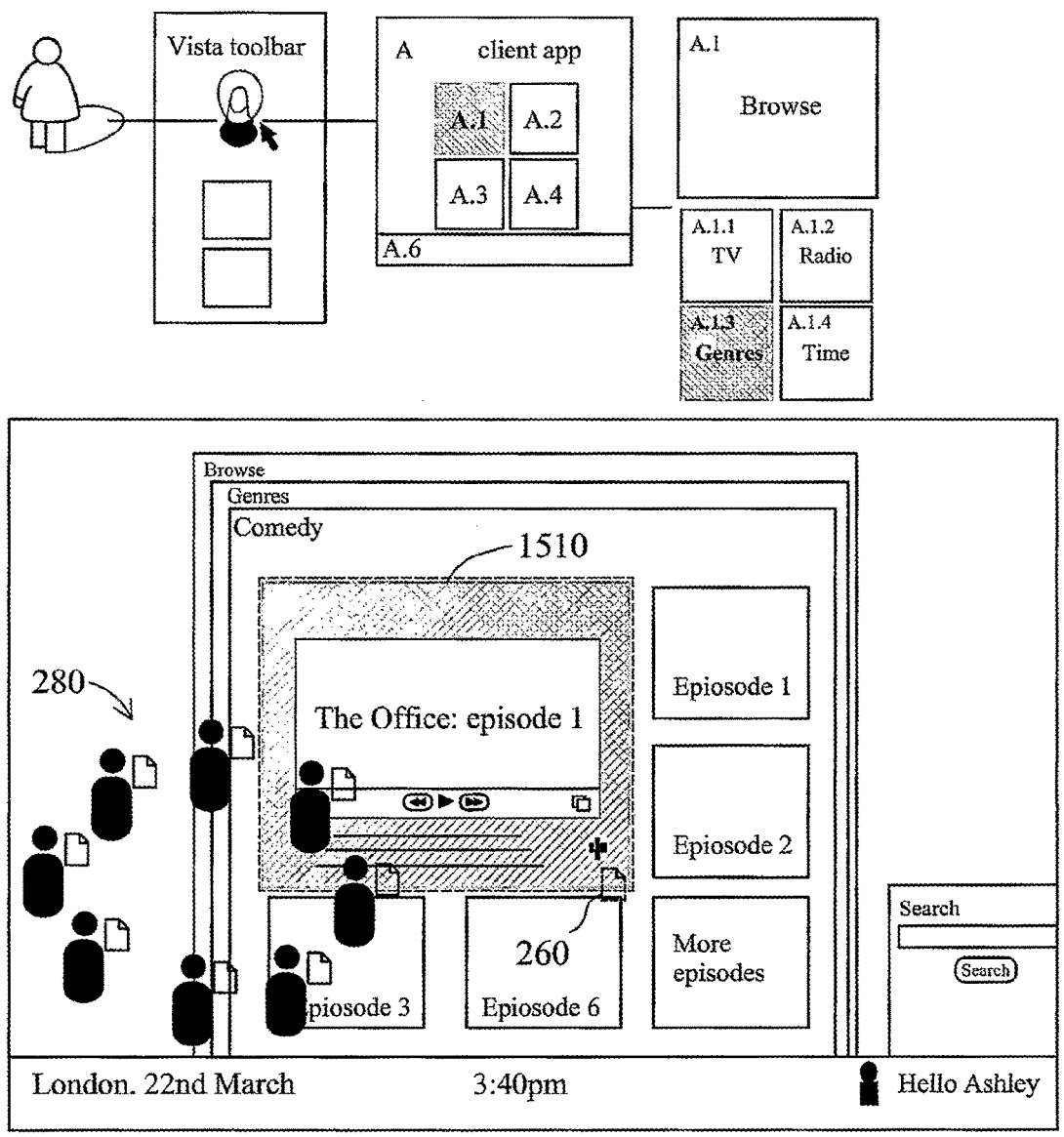
FIG. 17 is a simplified functional level diagram still further illustrating operation and functionality of the aspect represented in FIG. 9.
Figure 18:
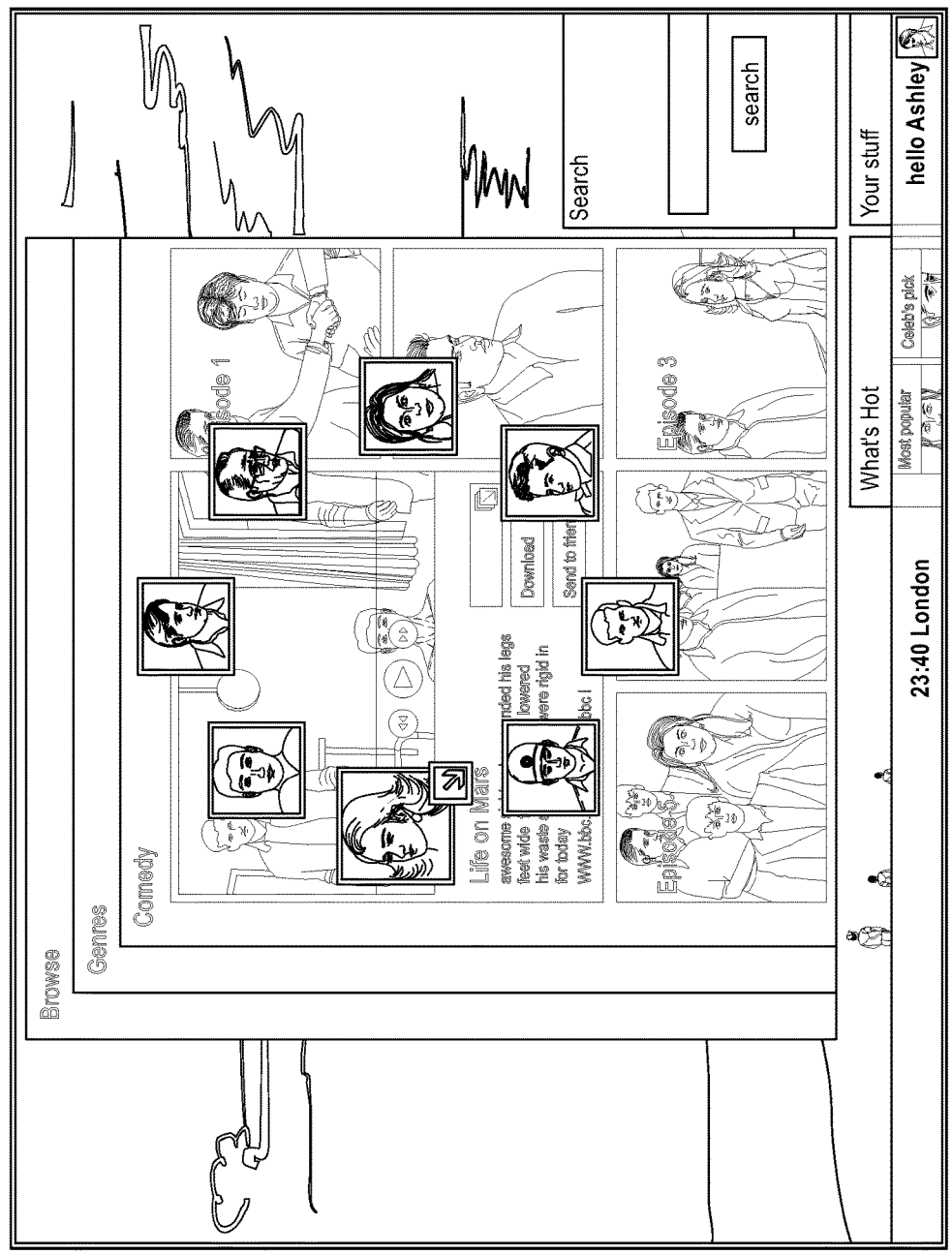
FIG. 18 is an exemplary screen shot illustrating the functionality represented in FIG. 17.
Figure 19:
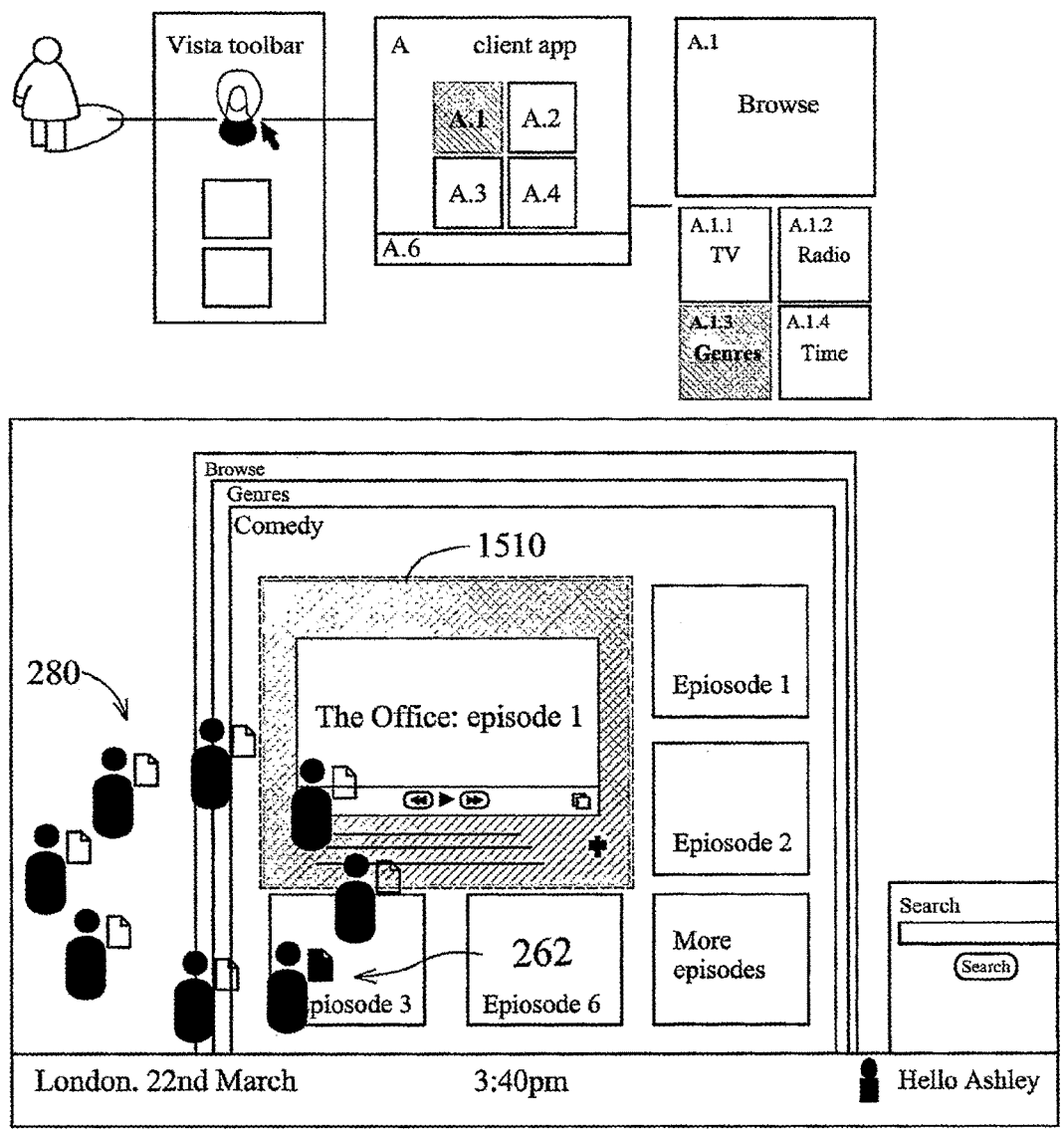
FIG. 19 is a simplified functional level diagram still further illustrating operation and functionality of the aspect represented in FIG. 9.
Figure 20:
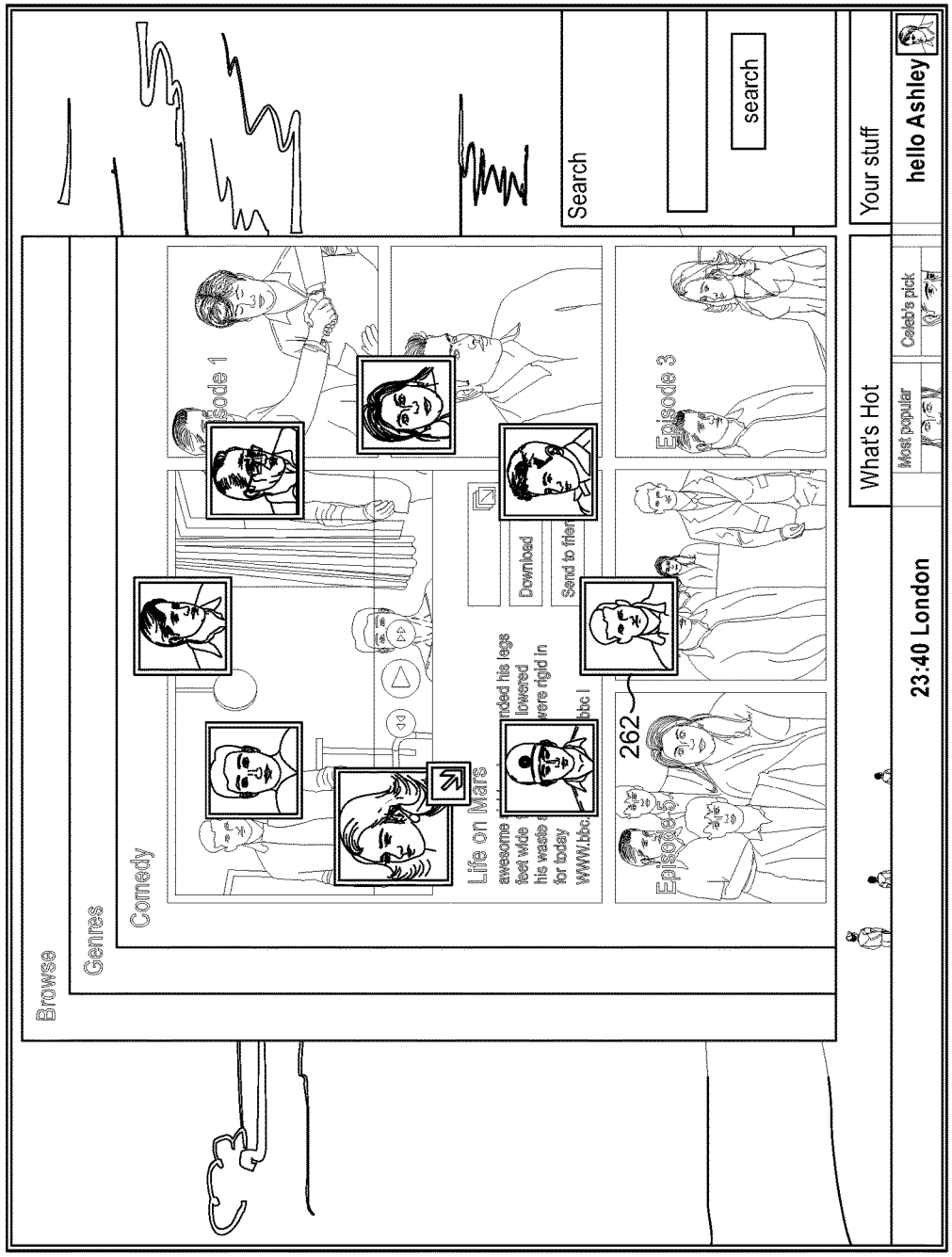
FIG. 20 is an exemplary screen shot illustrating the functionality represented in FIG. 19.

Further, within the Browse functionality, the operation of a user browsing for available comedy content is represented in the functional level diagrams of FIGS. 11, 13 and 15 and exemplified in the screenshots of FIGS. 12, 14 and 16.

For example, in operation, if the user wishes to use the Browse functionality to navigate to the comedy series 'The Office' (Browse>Genres>Comedy>The Office) the user may initially select the browse quadrant (A.1). As shown in FIGS. 9 and 10, within the Browse quadrant (A.1) the user is presented with an area comprising four sub-options: TV, Radio, Genres and Time. The user then, in operation, selects the sub-option Genres to bring up a sub-area comprising nine further sub-options (Browse>Genres) as shown FIG. 12. On selection of the desired sub-option within the Genres sub-area (the Comedy icon 1210) (Browse>Genres>Comedy) a further sub-area 'Comedy' comprising nine further comedy selection sub-options is displayed allowing the user to select a 'The Office' sub-option (Browse>Genres>Comedy>The Office).

This can be regarded as a 'fractal' directory display pattern, as each 'parent' content access indicia of an array of such indicia can in turn comprise an array of 'child' content access indicia, each displayed as a sub-area within the screen area of the 'parent' indicia.

As seen in FIGS. 15 and 16, on selection of 'The Office' sub-option, the 'Comedy' sub-area is modified to provide a media player section 1510, which is displayed over the four spaces previously occupied by a two by two grid of the previous selection thumbnails. A peripheral selection of five 'episode' thumbnails is provided in the remaining five spaces, representing different episodes (in this case of 'The Office') which the user may wish to play on a media player in the media player section 1510.

As illustrated, each of these sub-areas is a square comprising a three by three grid of square thumbnails. In addition, the display is dynamic; the thumbnails fade in and out and are presented as slide shows of top level promotions for that individual sub-section. If the user clicks on any of the thumbnails, they are able to access that particular content object directly and are presented with the related options (Download, Share, Play preview, Book Series), as shown in the media player section 1510 of FIG. 16.

Transition 'morphs' from one section to the next can be realised by the related content thumbnails—that now make up the selected sub-section—flying in from the edges of the screen taking their place in the sub-area array. If the user decides to select another episode within this view, the previously selected episode returns to its original thumbnail size and the newly selected episode opens up and displays its related options.

It will be noted that the tree structure represented by the higher level tabs Browse, Genres (in the upper left hand corner of the Comedy quadrant shown in FIG. 16) is not a traditional 'windows-type' cascade but, in accordance with the common presentation structure of the media player, none of the screen areas extends beyond the lower right hand corner of the Browse quadrant, so as not to obscure the other top level quadrants.

The provision of the cascade such that each level remains available represents a further global behaviour 250 of the interface. It will be appreciated that this further global behaviour 250 is equally applicable to the other quadrants.

As will be appreciated, the user is provided with a very simple and effective 'WYSIWYG'(What You See Is What You Get) visual navigation reference of exactly where they are in the content hierarchy, and is able to navigate directly to a content option or to go step-by-step visiting successive levels within a sub-section. The user is also able to readily trace back their steps in a single click of the mouse. This navigation behaviour is common across the whole application, giving an easy rhythm and familiarity which the user very quickly masters.

Selection of the Time quadrant A.1.3, within the browse quadrant, brings up a calendar which allows a user to select particular days in the past and then access a selection of content that was broadcast on those days, or to select a future day and to select content to be downloaded after broadcast (a booking system).

It will be noted that the application of the invention could of course employ more than four top-level selection areas or quadrants. For example, 6, 8 or 9 top-level selection areas may be used (preferably shaped and dimensioned so as to fit into the relevant quadrant), which would allow the unselected areas to be easily positioned around a particular selected area.

Figure 21:
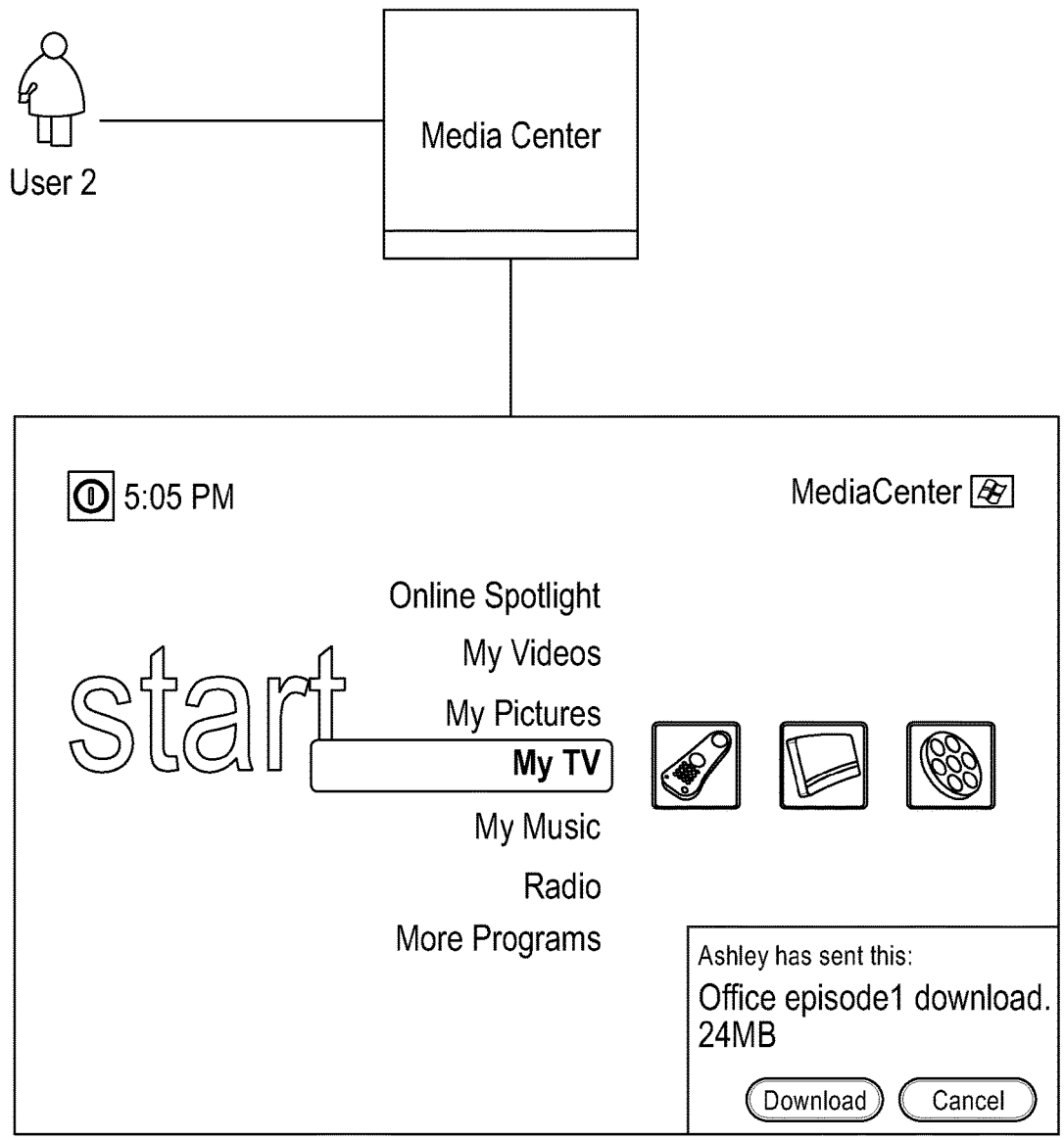
FIG. 21 is a simplified functional level diagram still further illustrating operation and functionality of the aspect represented in FIG. 9.
Figure 22:
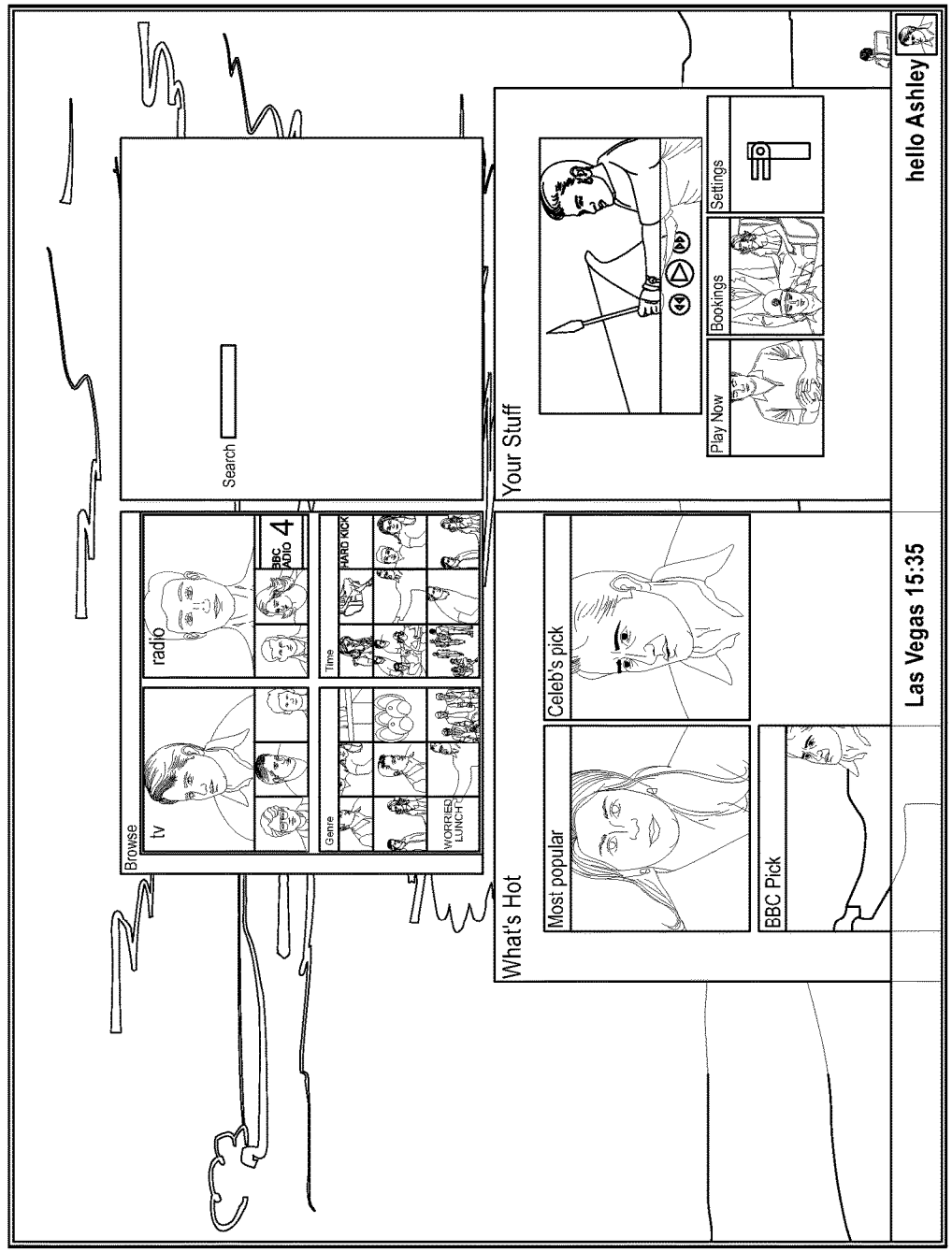
FIGS. 22 to 30 are screenshots illustrating additional/alternative functional aspects of the interface of FIG. 1.
Figure 23:
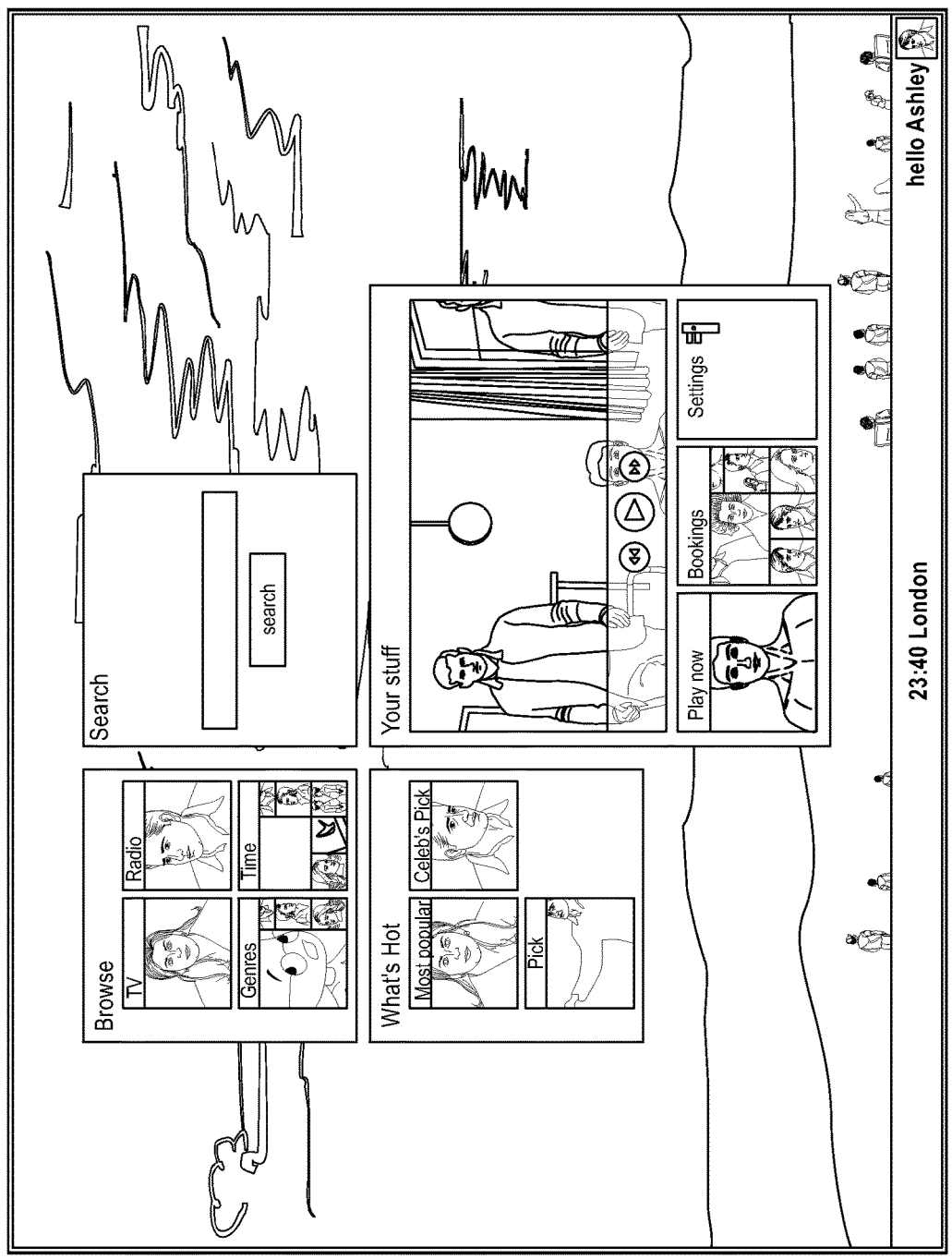
Figure 24:
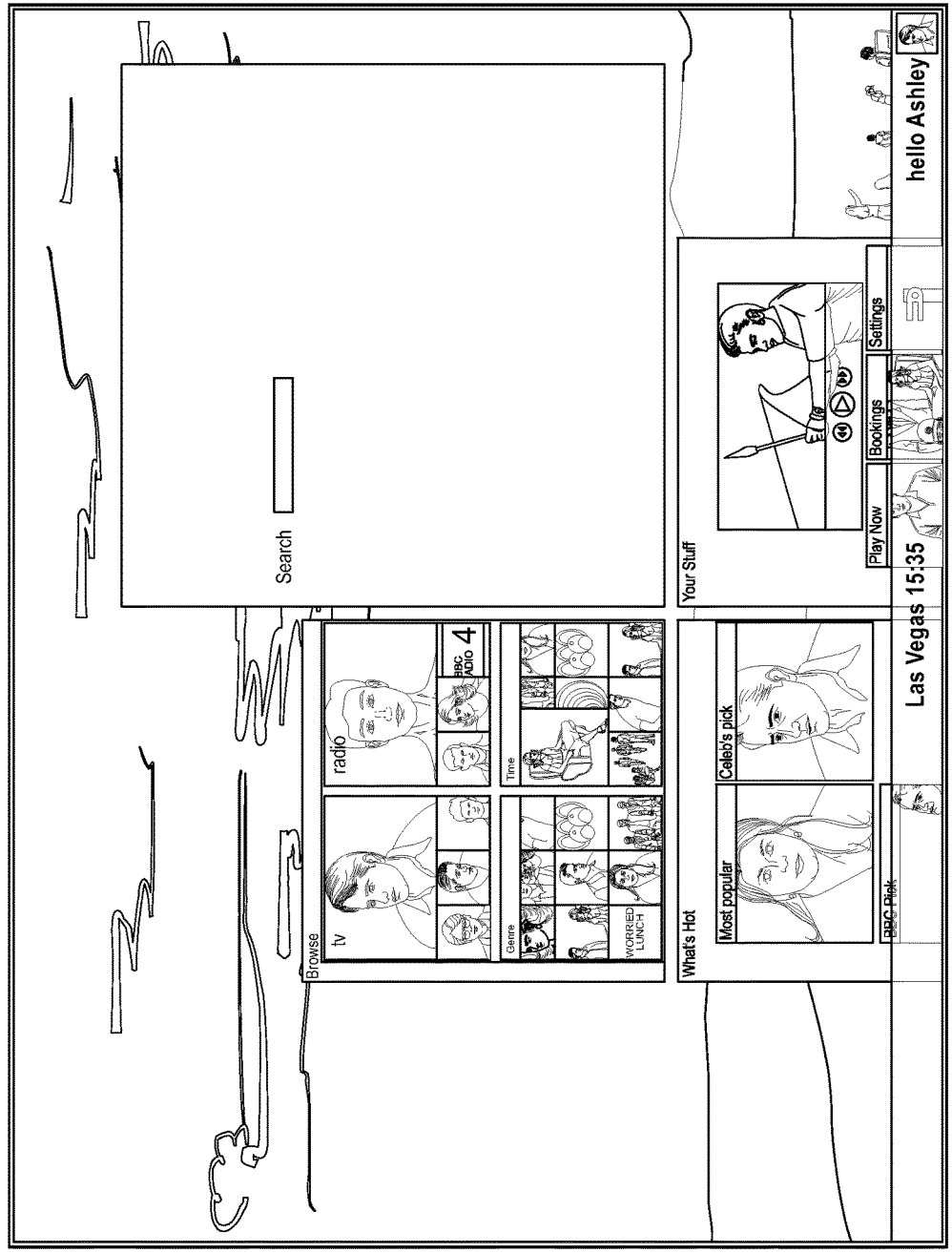
Figure 25:
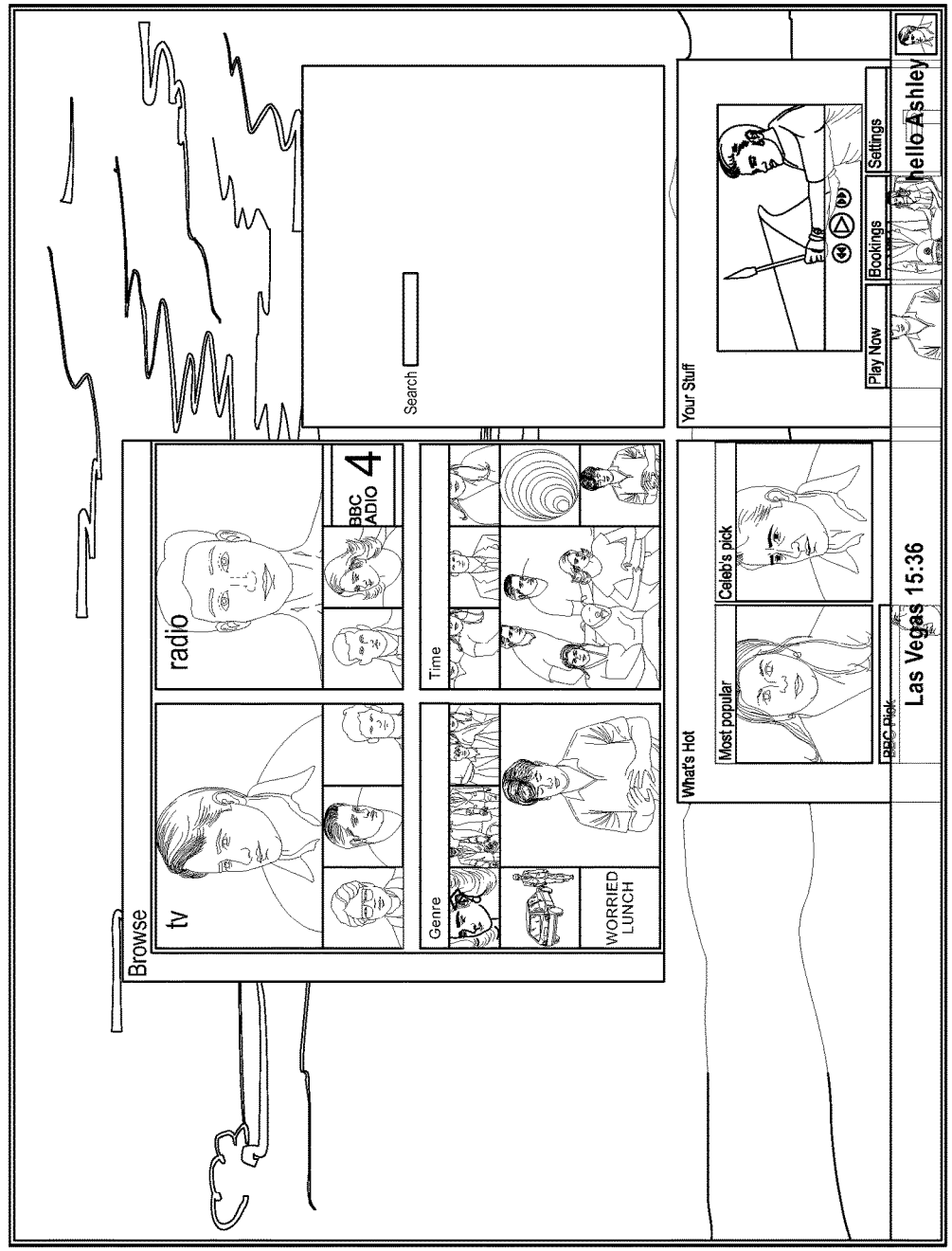
Figure 26:
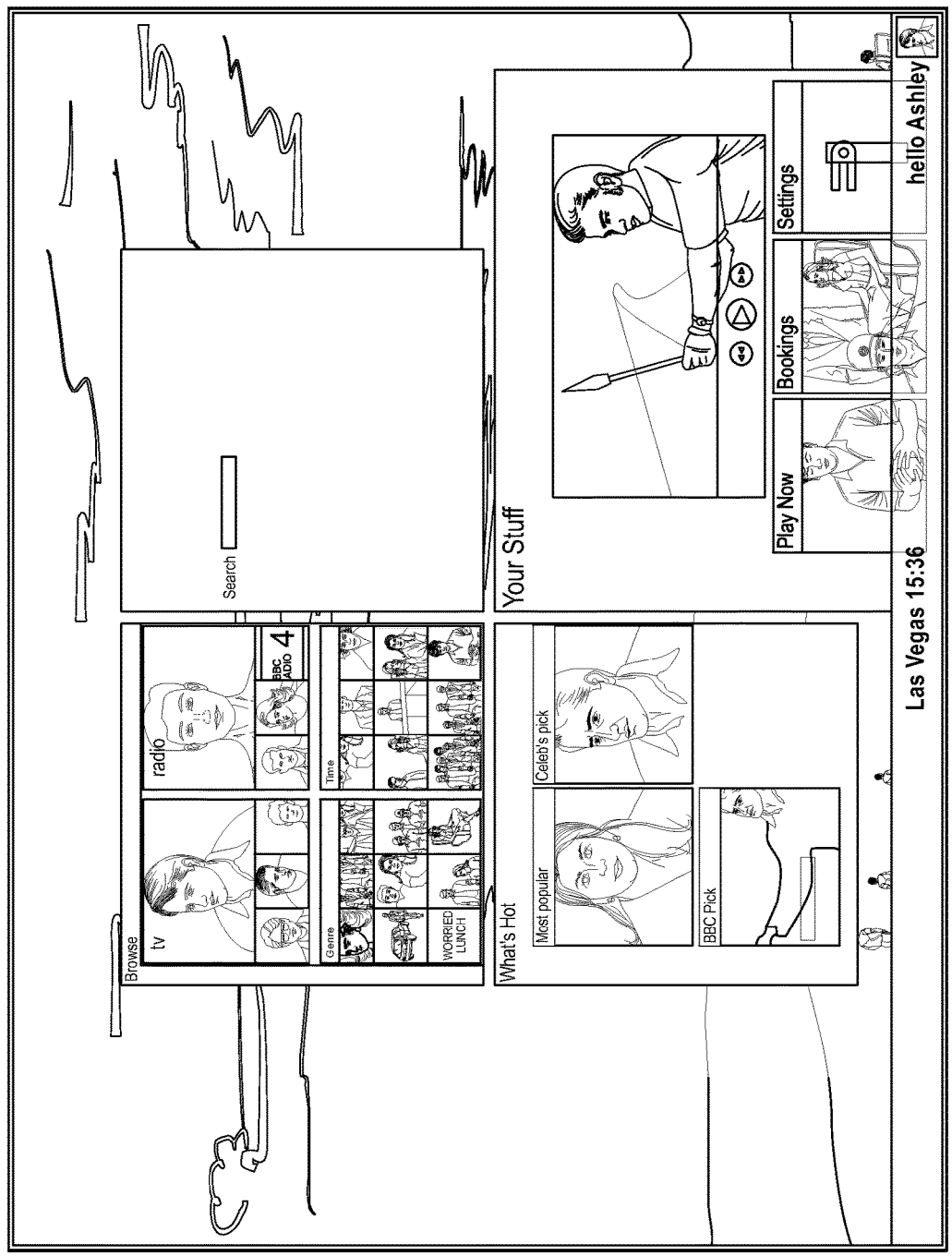
Figure 27:
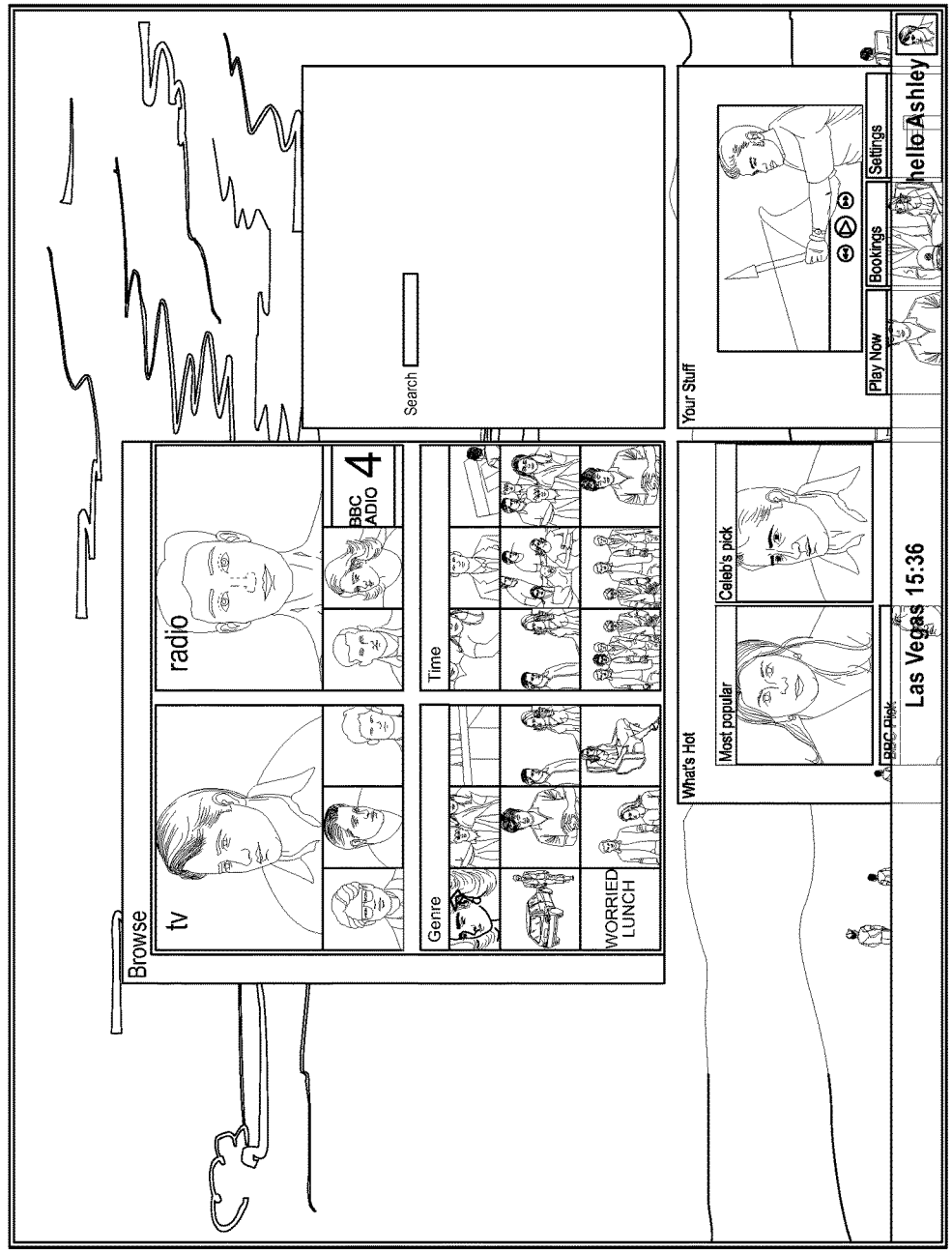
Figure 28:
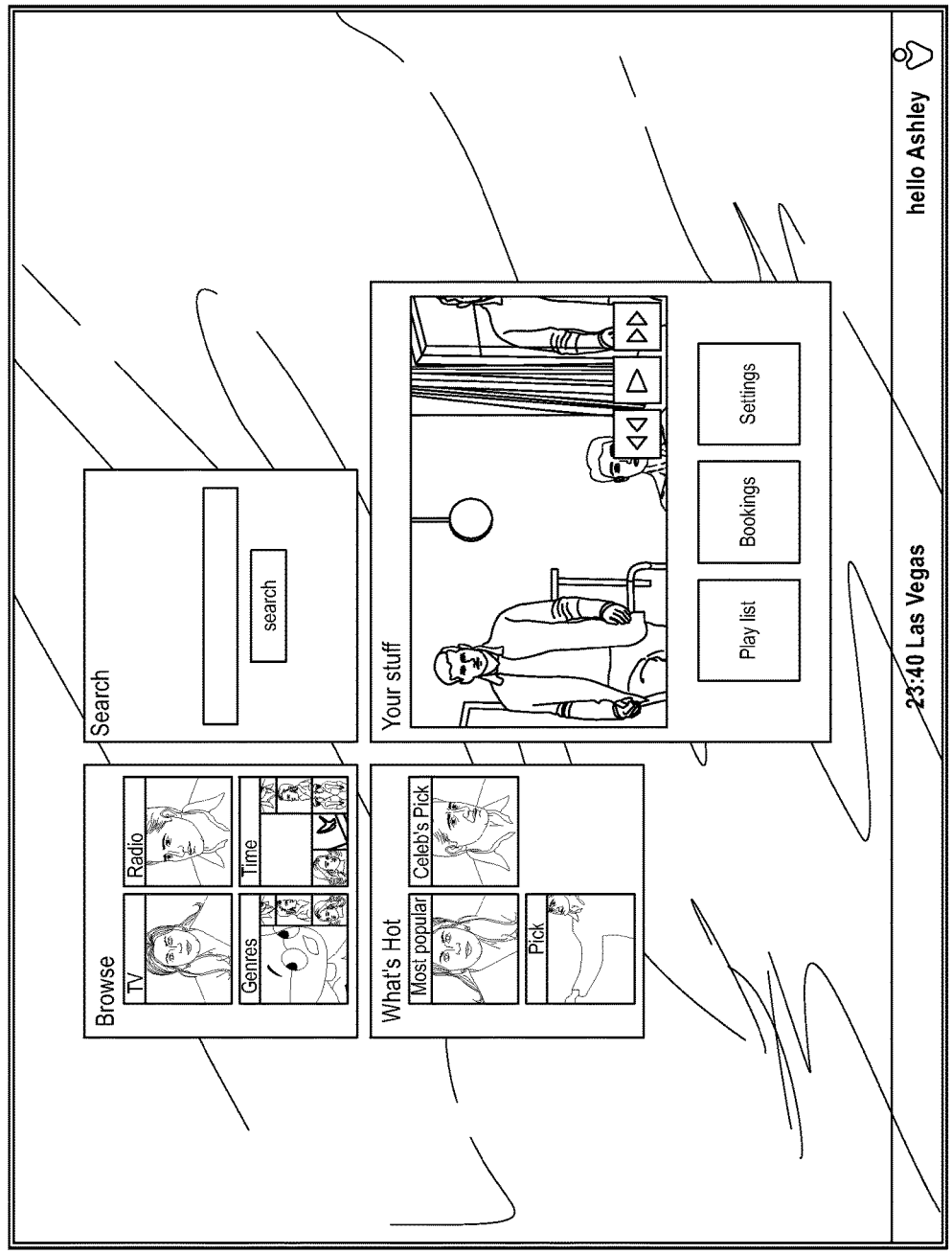
Figure 29:
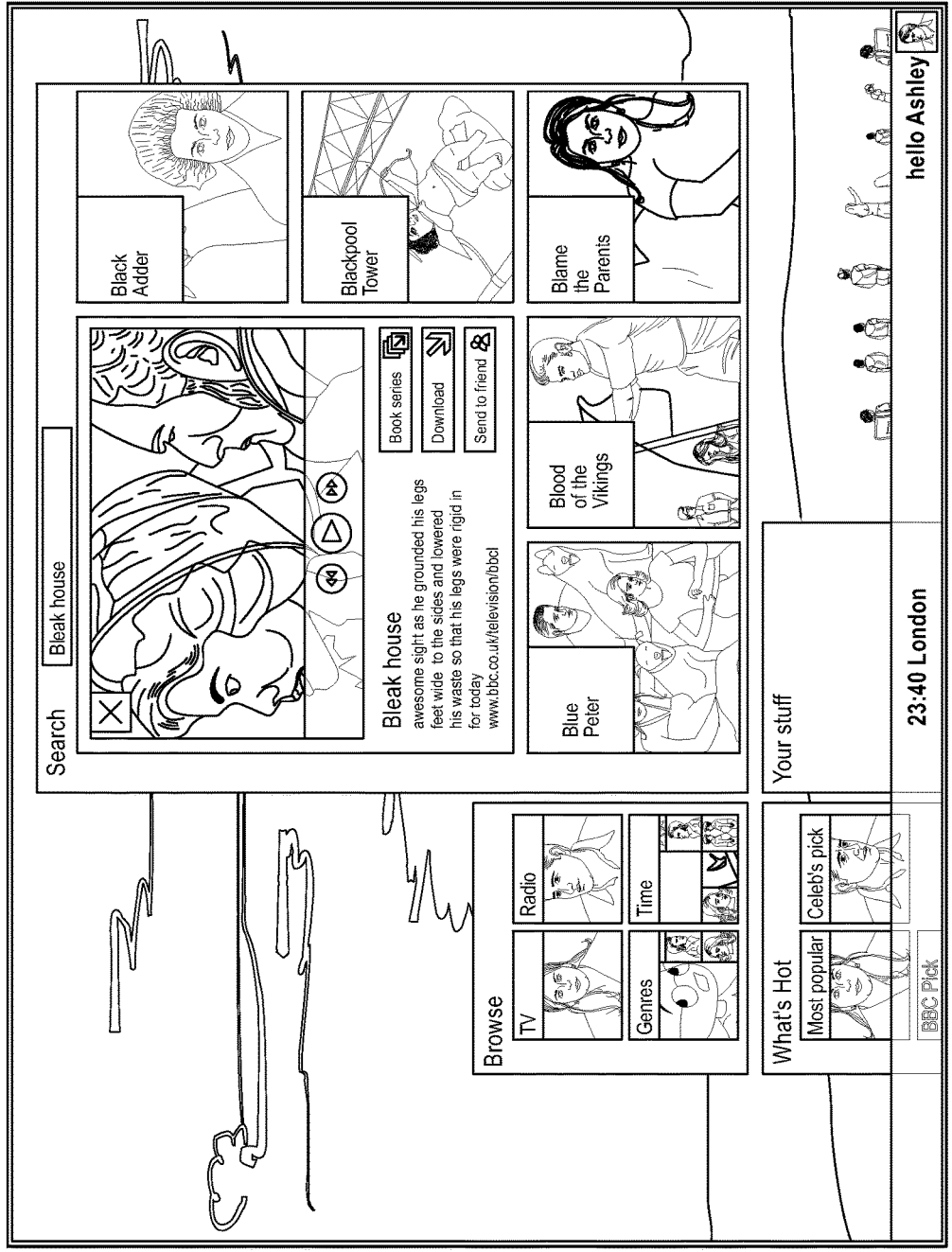

FIGS. 17 to 21 relate to a 'buddy list' functionality, allowing the user to effect selection of one or more individuals on a 'buddy list' (contact list) and to transmit selected content to the selected contact(s). When the user selects 'Send to a friend', the application brings up an animated rotating circle 280 of images of contacts or friends (see FIG. 18), and the user can drag and drop a representation of the content 260 he or she wishes to send onto a particular image 262 in order to effect the transmission of the content. FIG. 21 illustrates the selected contact (User 2) receiving a notification of transmission from the user (User 1) on their media interface.

The circle 280 is configured to hover over the user interface and to rotate in response to the user moving a mouse pointer over the list. It will be appreciated that rotation may slow down as each image moves beneath the focus of the mouse pointer.

The list centred at a screen location away from the expanded container such that the list does not significantly obscure the content of the container and in particular the content selected for sending to another user. If necessary, part of the contact list may be located off the edge of the visible screen area to ensure optimum use of the visible screen estate.

Figure 30:
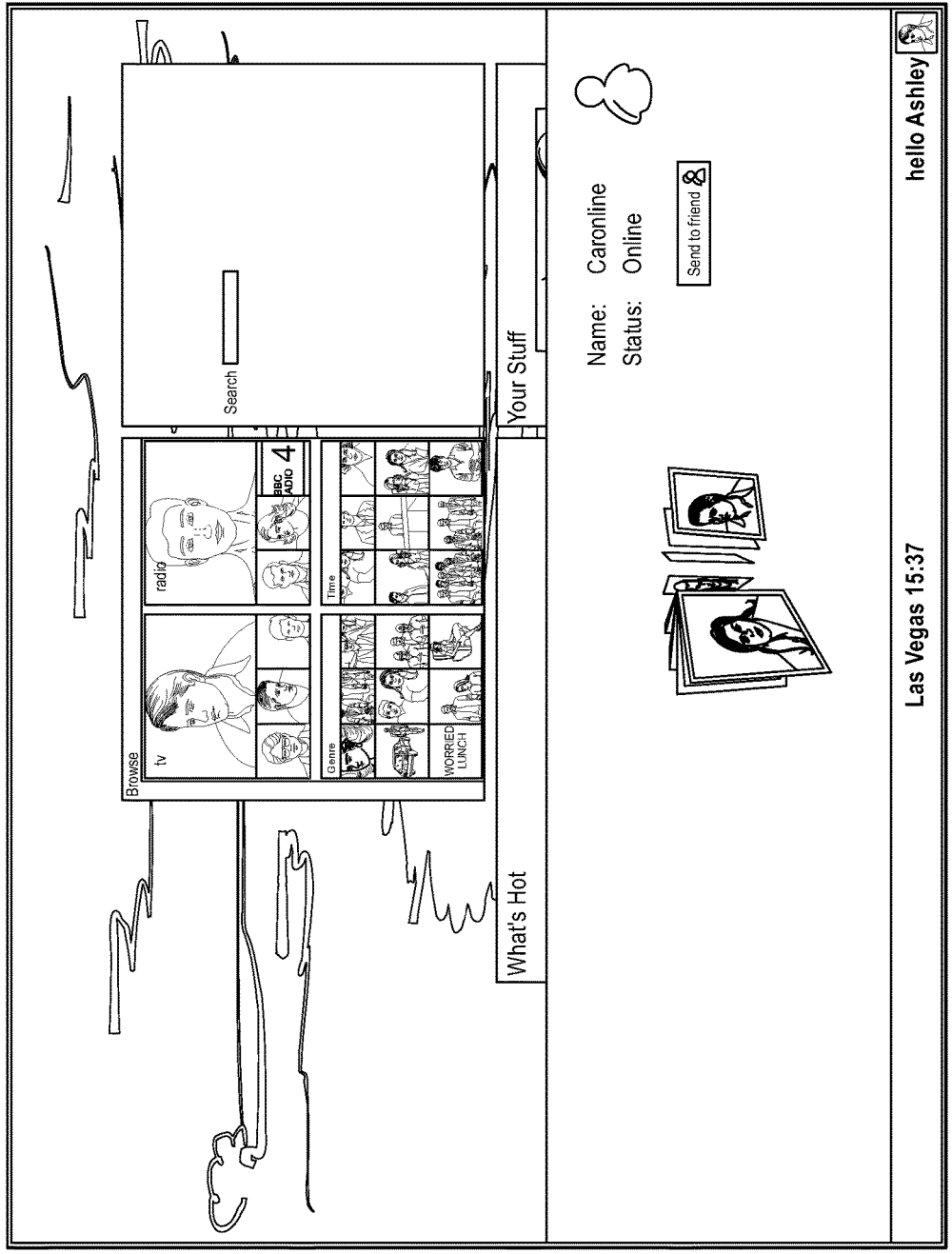

The 'buddy list' functionality may alternatively or additionally provide for a contact list having the appearance of an animated carousel of images (or Rolodex™), as seen in FIG. 30, which appears to rotate in response to a user's mouse actions, for example, hovering the mouse pointer over a particular part of the list/image. Thus, the image of one contact may be brought into the foreground, whilst another image is moved into the background. The carousel appearance is particularly advantageous because it further optimises the use of screen real estate thereby maximising the available visible area. Other compact forms of the contact list could also be used, for example, a 'flip-over' index card system in which each 'index card' carries an image of a contact in the user's contact list. A choice of such appearances may be provided by the interface according to user preference.

Three particular examples of the operation of the user interface are now provided:

Function 1: Navigating Between Sections i.e. Quadrants
Pre-Requisites:
 1. User clicks on a program startup icon.
 2. The application opens and either takes over the entire screen estate or runs on an existing desktop, alongside other applications. The four quadrants rapidly appear on the screen from the horizon expanding from a relatively small size to a rest position and size. At the same time the opacity of the quadrants increases from zero to one hundred percent.
 3. The user logs in and the user defined application wallpaper is provided as the backdrop.
How:
 1. The user rolls the cursor (mouse pointer) over any quadrant. The quadrant starts growing in size outwards from its position within the 4 squares, for example as seen in FIGS. 3, 4, 9 and 10.
 2. The other quadrants start decreasing proportionately in size.
 3. The user clicks within the large quadrant. The selected quadrant comes towards the user, behaving in the manner of a giant wheel, with one square coming to the foreground, while others go to the bottom into the background. The other three quadrants become more compact and move off the screen depending on their position within the four quadrants, for example as seen in FIGS. 11 and 12.
Advantages:
 1. The user can always access any of the other key sections (quadrants) by one click on the compact quadrants to the side of the screen.
 2. The user doesn't lose any sub-levels they have browsed to within a quadrant as the application still retains and displays their current sub-level even if the user chooses to navigate to another top level quadrant. For example, when the user is in Browse>Genres>Comedy>The Office, and decides to click on the Search Quadrant, the Browse quadrant becomes compact and moves to the edge. Nevertheless, the browse quadrant continues to display, in its compact state, the stage of browsing the user had previously reached (Browse>Genres>Comedy>The Office).

Function 2: Navigating to a Single Content Item
Pre-Requisites:
 1. The user has selected a quadrant to navigate within. See Function 1
How:
 The user selects a sub-section within the main quadrant, for example, Browse>Genres>Comedy as shown in FIGS. 11 and 12.

The user navigates to this sub-level by clicking on any of the main sub-sections within a main quadrant. For example, if the user is within 'Browse', they are presented with four sub-section choices: TV, Radio, Genres and Time.

Each sub-section choice is displayed as a square based around a three by three grid of smaller square thumbnails. The display is, however, dynamic. The thumbnails fade in and out, acting like a slide show of top level promotions for the individual sub-section. Furthermore, at any point in time, one of the small thumbnails may expand to become a larger thumbnail, as part of the slideshow behaviour, before returning to its original size. The larger thumbnail takes up a corresponding section of the grid, for example, a two by two section, a two by three section, or even the full three by three grid. Such behaviour is illustrated in the screen shots of FIGS. 24 to 27; in particular in the thumbnails representing the sub-sections of the browse quadrant.

The user may click directly on any of the displayed thumbnails to navigate to the associated content object directly. On selection of the content object they are presented with the related options (for example, Download, Share, Play preview, Book Series or the like). Alternatively, the user can click anywhere on the sub-section title overlay of the key four sub-section choices, for example TV, Radio, Genres and Time, to be taken to the root level of that particular sub-section.

On clicking on the sub-section title, the top level parent quadrant recedes to the background with 20 percent opacity and the sub-section that user has selected comes on top of the parent with 80 percent opacity. This transition or 'morph' happens like a wipe. The related content thumbnails required for making up the selected sub-section fly in from the edges of the screen and take their place as a new grid of squares, maintaining the three by three ratio, thereby giving rise to the fractal like behaviour as discussed earlier. For example, in FIGS. 11 and 12, Genres is shown comprising top level genres as follows:

Genres>
>Kids
>Drama
>Sport
>Comedy
>Music
>Learning
>Lifestyle
>News
>A to Z (of all genres)

Each thumbnail representing each of the genres also exhibits the same slideshow behaviour discussed above with reference to the top-level sub-section choices. In FIG. 12, each genre is exhibits a single promotion taking up the complete square grid (in this case four by four or two by two). For example, in the case of comedy, there is an Ali-G promotion thumbnail exhibited which, after a predetermined time (e.g. 5 seconds), returns to being a smaller square thumbnail allowing the user to see four square thumbnail promotions within the comedy sub-section until another promotion takes over all four squares (for a two by two grid).

In FIG. 16 the user navigational journey is Browse>Genres>Comedy> The Office. In this embodiment the navigation never goes deeper than four levels down. It will be appreciated, however, that the information architecture may be constructed to allow the user can go down more levels.

If the user selects 'The Office' on the top level of Comedy, by clicking on a 'The Office' thumbnail, the complete series of 'The Office' that are available for download in a seven day catch-up (including both previous and future episodes) appears on a 'The Office' level. The default latest episode available for download appears in a media player section of the screen with all its related options (Download, Share, Play preview, Book Series), as seen in the FIG. 16.

If the user decides to select another episode within this view, the previously selected episode goes back to its original thumbnail size, and the selected episode opens up, and displays the related options, from its current position.

Advantages:
1. The user gets a WYSIWYG (What You See Is What You Get) visual navigation reference of where they are in the information hierarchy due to an 'onion skinning' type approach.
2. The user can either navigate directly to a content promotion or alternatively go step by step visiting each level within a sub-section. They can also trace back their steps in a single click.
3. The navigation behaviour is substantially the same everywhere (for example, the way the content thumbnails fly onto the container, the receding of the containers, the slideshow behaviour, etc.). This gives rise to an easy rhythm and a familiarity of what to expect each time the user clicks on a level down or on a promoted content thumbnail within a sub-section. This considerably enhances the speed with which a user becomes familiar with the interface and reduces the time taken to find content of interest.

Function 3: Searching for an Item and Getting to the Relevant Result
Pre-Requisite:
1. The user selects the Search quadrant.
2. The user brings the cursor (mouse pointer) focus to the search field.
3. The user starts typing within the search field.

How:
1. Initially the user starts by typing a single character, which may be the first character of a longer search term. As soon as the character is typed related content results (represented by associated thumbnails), having a keyword, metadata, title and/or the like beginning with the typed character, start filling up the screen as shown in FIG. 6.
2. As the user types in a second character of a longer search term, the previous results reduce dynamically depending on the new character, and the associated thumbnails increase in size to give greater clarity of what the represented content is.
3. This search behaviour continues until the user completes the keyword(s) (search term(s)). The search results which are made up of related content thumbnails keep decreasing dynamically in dependence on their relevance to the keyword(s) being typed by the user as illustrated in the screen shot of FIG. 8.
4. At any time during the search process, if the user clicks on any thumbnail, it (or the associated content and/or user options) expands to take up the screen estate of four thumbnails (as seen in FIG. 8), the rest of the thumbnails retaining their size and position.

Advantages:
1. The user gets a WYSIWYG way of understanding what the most relevant search results are because they are encouraged by the application to keep typing their keyword, until the term makes sense. Hence, if there are typos or very common words (for example, 'and', 'the', 'A' etc) the system displays numerous small indistinguishable thumbnails. Each thumbnail only becomes bigger in size, to illustrate the associated content with greater clarity, when the user continues typing and/or completes the keyword/search term.

Figure 31:
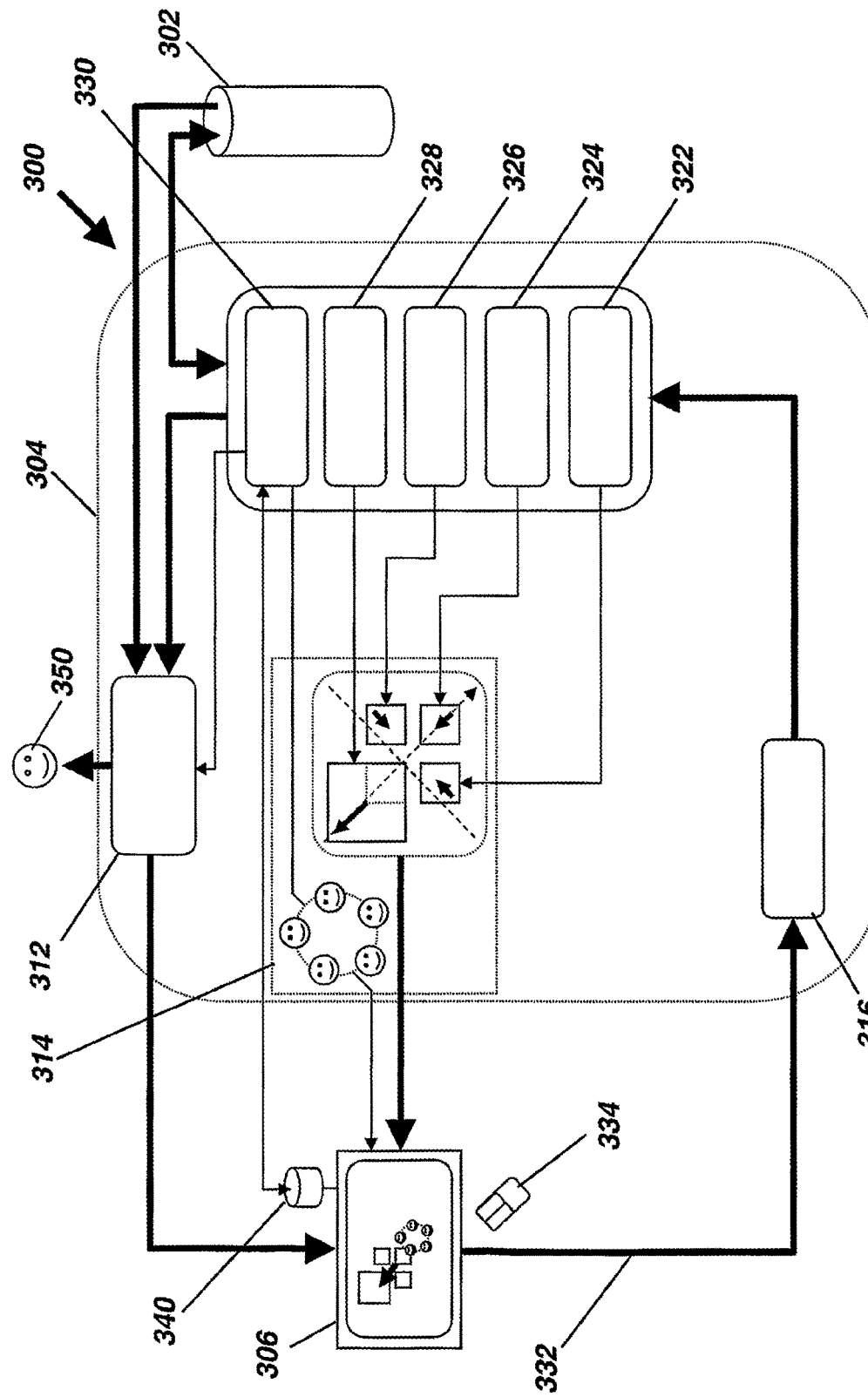
FIG. 31 shows a functional block diagram of a system embodying an aspect of the invention.

FIG. 31 shows a system embodying the invention generally at 300. The system comprises a content server 302, a user interface 304 and a user display device 306.

The content server 302 is configured for the storage and transmission of content (and related information), via the user interface 304, to the user display device 306. The content server may be implemented in any suitable manner and may comprise a single computer based server having an appropriate content database, or may comprise a more complex distributed/undistributed server system comprising a plurality of computer devices, discrete storage, and/or the like.

The user interface 304 is configured for providing efficient access to content available in the content server via the user's display device. The user interface comprises a display generation module 310, a content transmission module 312, a display output module 314, and an input analysis module 316.

The display generation module 310 is configured for generating and controlling a display comprising a plurality of quadrants as generally described previously. In accordance with this the display generation module comprises a plurality of dynamic display modules/sub-modules 322, 324, 326, 328, and a contact (or 'buddy') list generation module/sub-module 330.

Each dynamic display sub-module is configured for controlling the functionality, content, appearance, location and dynamic behaviour of an associated quadrant and, in particular, the expansion and/or contraction of each quadrant in response to feedback 332 from a user's pointing device 334. Thus, the dynamic display sub-modules operate together as part of the display generation module, in cooperation, to optimise use of the available visible screen estate.

The display generation module (and the associated sub-modules) also cooperate to provide signals to a user (for example suitable for visual display) about the availability and status of content within the system and associated information. The status and/or associated information may, for example, include: download status; details of when the associated content was/will be made available; when the content expired/will expire; popularity (e.g. number and/or frequency of download); other similar content (e.g. within the same genre, episodes in the same series, content popular with other users making the same download); and/or any other similar information.

The contact list generation sub-module 330 is configured for interacting with a user contact list database 340 to produce a contact list having an appearance as generally described previously. The sub-module 330 also co-operates with the dynamic display sub-modules 322 to 328 to dynamically move the position of the list relative to the quadrant display, as the quadrant display changes, to further optimise the use of the visible screen estate The display output module 314 is configured to output the generated display to the user display device 306. If necessary, the output module 314 converts the generated display (and contact list if required) into a format according to the capabilities of the device such as screen size, aspect ratio, resolution, colour availability etc. Feedback from the user's pointing device is analysed by the input analysis module 316 to assess the location of the pointer relative to the generated display. Output from the analysis module 316 is used by the display generation module to dynamically control the generated display according to pointer location as generally described previously.

The content transmission module 312 is configured for providing selected content to the user, and/or to another user 350 in the user's contact list.

Further aspects of the user interface are described with reference to FIGS. 22-30.

The following is a non-exhaustive list of a number of preferred variants and/or features of the invention:

It is possible to access, play, share, book and/or download content at different levels within the interface, either by drilling down to a particular category, or by accessing a particular content item directly, for example, from a promotional slide show.

The main panes form a grid with a centre point (or vertex), and the panes are in register with one another around this centre point (or vertex).

On mouse-down the screen estate is optimised for the selected pane.

In a variant, on mouse-over a pane does not expand to the full size it would expand to on mouse-down.

On mouse-down the other panes exhibit reduced animation.

In the browse sub-menu, on mouse-over the current size is retained, since it has already reached its maximum size.

The user interface provides a user, at any point in time, with an overview of where they are.

In contrast to other guides this guide is not bound by time, since any content item can be included in the "genre" category.

In a variant, the vertex of the panes remains centred on mouse-over, but moves at a 45-degree angle on mouse-down.

The text in the upper panes switches to the lower portion of the pane when the upper pane is shifted to the top edge of the screen.

Preferably, the panes or rectangles are oriented with their sides parallel with the respective sides of the display.

Preferably, the opacity of a pane increases once it becomes active, and vice versa.

Prior to mouse-over all the panes exhibit animation; with mouse-over, at least one pane, if not all, animate; on mouse-down only the selected pane animates.

Panes might be rectangles or preferably squares, but could also be other geometric shapes, so long as they are substantially in register, so that one of the vertices of each of the shapes meets at a respective centre point.

At all levels in the graphical user interface there is direct access to content items (for playing, download, sharing and booking).

The startup icon may be configured for dynamic behaviour on mouseover and/or mouseclick (mousedown). For example, the icon preferably grows gradually on mouseover. Alternatively or additionally the icon preferably bounces, before launching the application, on mouseclick.

Preferably, the interface is configured to obtain the latest download status information for example the number and nature of new downloads available.

When, on startup, the rapid growth of the containers (quadrants) from small to big (emerging from horizon) and the associated increase in opacity from zero to 100 percent is complete the containers may enter a 'rest' condition in which the containers continue to move gently in the manner of a wind-mobile The vertex at which the corners of the containers meet is preferably aligned to centre. On mouseover a particular container, the container preferably grows directionally from centre to outward whilst the others grow proportionately smaller.

Preferably there is no border around each sub-section choice e.g. TV, Radio, Genre Time. There may, however be a space between each thumbnail, for example a 1 pixel space.

The font size used in the titles and/or other text within the quadrants is expandable within predefined limits. Preferably, for example, the font size is limited to a maximum of 19 points and a minimum of 12 points.

The title appearing in the top left of each container (in the glass effect panes) is preferably located 15 pixels in from both top and left edges. The font may be any suitable font, for example, Gill Sans Bold or the like.

In the search quadrant, the search field may be located centrally (horizontally or vertically) and may expand dynamically as the container expands.

When a sub-section is selected, for example by moving a mouse pointer over an associated thumbnail (or group of thumbnails), a selection border preferably appears around the thumbnail/thumbnail group. The selection border may be any suitable thickness and colour for highlighting the selection, for example a 3 pixel wide blue border. A possible appropriate colour may be defined in computer terms as: Red=9; Green=145; Blue=223. This colour provides a particular good distinction for highlighting the selection against any of several backgrounds.

Preferably, when the contents of a container are expanded and the remaining quadrants extend partially off the visible screen area (as seen in FIG. 16) the interface maintains an alignment such that the title of the container is always readable.

When specific content is selected and displayed in a media player section of a quadrant, the media player showing the content may be 'detachable' from the rest of the interface for movement and/or operation independent of the interface. A plurality of such players may be run substantially simultaneously. When detached from the interface a close button ('X' on FIG. 29) may be provided to allow the user to shut the media player down.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A method of providing content to a user, the method comprising providing, via a display device having a display screen, a graphical user interface for a computer program, the interface comprising:

an array of panes each providing simultaneous access to a different particular aspect of the program, thereby enabling a user to navigate through the program, the panes being in register with one another at a vertex corresponding to an area in which all the panes meet, each of the panes being adapted to provide a plurality of sub-panes within the area of the pane, each sub-pane providing access to a further particular aspect of the program, the panes being adapted to expand while maintaining their respective aspect ratios when highlighted by a pointing device, wherein the panes remain in register with one another at the vertex as a pane expands and the sub-panes being further adapted to expand within the area of their related pane when highlighted by the pointing device, wherein the expansion of a highlighted pane is accompanied by a corresponding shifting of the other panes towards a periphery of the display screen, wherein said expansion is accompanied by a corresponding contraction of the other panes while maintaining their respective aspect ratios, and wherein as the highlighted pane expands it moves towards the centre of the display screen.

2. The method as claimed in claim 1 wherein as the highlighted pane expands, the vertex moves along a diagonal line towards an outer edge of a display screen on which the program is executed, wherein the vertex moves at an angle of 45 degrees, and wherein as successive panes are highlighted the vertex moves along an "x" centered in the middle of a display screen on which the program is executed.

3. The method as claimed in claim 1 wherein the panes and sub-panes are in the form of rectangles or squares, wherein the panes and sub-panes maintain their generally rectangular or square shape during their expansion or contraction, wherein a square number of panes are provided, wherein the panes do not overlap with one another at any time, and wherein the relative positions of the panes to one another do not change.

4. The method as claimed in claim 1 wherein the sub-panes exhibit the same behavior as the panes, wherein the sub-panes expand, contract or centralize in a similar fashion to the panes, and wherein a sub-pane provides access to further sub-panes.

5. The method as claimed in claim 1 wherein while the pointing device continues to highlight a pane, the pane continues to expand until it reaches a specified maximum size, wherein if a particular pane is selected the pane will immediately expand to the maximum size, and wherein, once expanded, the selected pane takes up most of the screen real estate on a display screen on which the program is executed, and wherein the other panes are shifted to the outer periphery of the screen.

6. The method as claimed in claim 1 wherein each of the panes and sub-panes are animated prior to being selected, and wherein following selection the panes and sub-panes which have not been selected exhibit reduced animation and reduced opacity, and wherein the selected pane and sub-pane exhibit increased opacity.

7. The method as claimed in claim 1 wherein the interface is applied to a graphical menu, wherein the menu is accessed by selecting a particular sub-pane within the one of the panes, and wherein when selected the menu opens a calendar viewer which allows a user to select particular days in the past and then to access a selection of content that had been broadcast on those days, or to select a future day and to select content to be downloaded after broadcast.

8. The method as claimed in claim 7, wherein the graphical menu is for a media player or a content viewer.

9. The method as claimed in claim 1 wherein the user interface operates in a manner wherein the movement of a pointing device causes the expansion, contraction or centralization of panes or sub-panes in a currently selected pane and the pane, while intermediate panes are shown in a tree structure, and wherein the tree structure displays a set of cascaded windows all of which terminate on the same lower edge of the pane so as not to obscure the other panes.

10. The method as claimed in claim 1 wherein animations are shown in the one or more of the panes prior to selecting a particular pane, and wherein once a pane is selected the other panes move to the edges of the selected pane and are inactive.

11. The method as claimed in claim 1 wherein the number of panes allows a screen to be displayed with a selected pane in the center, and with the other panes positioned around the edges of the selected pane, and wherein a square number of sub-panes are provided within each pane.

12. The method as claimed in claim 11, wherein the other panes positioned around the edges of the selected pane are 6, 8, 9 or 12 panes.

13. The method as claimed in claim 1 wherein the panes are provided on a graphical background, and wherein the background graphic is selectable by a user.

14. A method as claimed in claim 1 wherein the panes expand and move/centralize around a square in the centre of a screen, wherein the size of the square is proportional to a factor of 1.6 times the size of an unexpanded pane, and wherein the panes expand to 1.6 times their size when hovered over.

15. The method as claimed in claim 1, wherein the array of panes is 4, 6, 8, 9 or 12 panes.

16. The method as claimed in claim 1, wherein the expansion of a highlighted sub-pane is accompanied by a corresponding shifting of the other sub-panes towards a periphery within the area of the pane, wherein said expansion of said sub-pane is accompanied by a corresponding contraction of the other sub-panes, and wherein as a highlighted sub-pane expands it moves towards the centre of the area of the pane.

17. The method as claimed in claim 1 wherein while the pointing device continues to highlight a sub-pane, the sub-pane continues to expand until it reaches a specified maximum size, wherein if a particular sub-pane is selected the sub-pane will immediately expand to the maximum size, and wherein, once expanded, the selected sub-pane takes up most of the area of the pane, and wherein the other sub-panes are shifted to the outer periphery of the area of the pane.

18. A system for providing content to a user for user interaction via a pointing device, the system comprising:
a display device operably connected to a user interface for providing visual indications of conditions prevailing in said system, wherein said conditions comprise the availability of said content; and wherein said interface comprises:
a display generation module which generates a graphical display on the display device in dependence on said conditions, said display comprising an array of panes in register with one another at a vertex corresponding to the area in which all the panes meet, and a plurality of related sub-panes within the area of the panes, each of the panes and related sub-panes, provides simultaneous access to a different particular functionality of said interface to locate said content;
an input analysis module which detects the presence of the pointing device over a pane and sub-pane; and
a dynamic display module which changes the size of a pane and sub-pane relative to the other panes and sub-panes in response to said detection while maintaining their respective aspect ratios, wherein the panes remain in register with one another at the vertex as a pane expands and the sub-panes expand within the area of their related pane, wherein the expansion of the highlighted pane is accompanied by a corresponding shifting of the other panes towards a periphery of the display screen, wherein said expansion is accompanied by a corresponding contraction of the other panes while maintaining their respective aspect ratios, and wherein as the highlighted pane expands it moves towards the centre of the display screen.

19. A computer program product comprising at least one non-transitory computer-readable storage medium having computer-readable program instructions stored therein for causing a computer to provide a graphical user interface of a computer program on a display for user interaction by a user, the interface comprising:
an array of panes each providing simultaneous access to a different particular aspect of the program, thereby enabling the user to navigate through the program,
the panes being in register with one another at a vertex corresponding to an area in which all the panes meet,
each of the panes being adapted to provide a plurality of sub-panes within the area of the pane, each sub-pane providing access to a further particular aspect of the program, and
the panes being adapted to expand while maintaining their respective aspect ratios when highlighted by a pointing device of the computer, wherein the panes remain in register with one another at the vertex as a pane expands and the sub-panes being further adapted to expand within the area of their related pane when highlighted by the pointing device,
wherein the expansion of a highlighted pane is accompanied by a corresponding shifting of the other panes towards a periphery of the display, wherein said expansion is accompanied by a corresponding contraction of the other panes while maintaining their respective aspect ratios, and wherein as the highlighted pane expands it moves towards the centre of the display.

* * * * *